(12) United States Patent  (10) Patent No.: US 8,300,167 B2
Hirato  (45) Date of Patent: Oct. 30, 2012

(54) DISPLAY PANEL, DISPLAY DEVICE, AND METHOD FOR MANUFACTURING DISPLAY PANEL

(75) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 391 days.

(21) Appl. No.: 12/593,131

(22) PCT Filed: Feb. 12, 2008

(86) PCT No.: PCT/JP2008/052262
§ 371 (c)(1),
(2), (4) Date: Sep. 25, 2009

(87) PCT Pub. No.: WO2008/152830
PCT Pub. Date: Dec. 18, 2008

(65) Prior Publication Data
US 2010/0085499 A1  Apr. 8, 2010

(30) Foreign Application Priority Data

Jun. 14, 2007 (JP) .................................. 2007-158016

(51) Int. Cl.
*G02F 1/1343* (2006.01)
(52) U.S. Cl. .......................................... 349/39; 349/187
(58) Field of Classification Search ........................ None
See application file for complete search history.

(56) References Cited

U.S. PATENT DOCUMENTS

| | | | |
|---|---|---|---|
| 4,554,050 A | 11/1985 | Minford et al. | |
| 5,462,638 A | 10/1995 | Datta et al. | |
| 5,781,262 A * | 7/1998 | Suzuki et al. | 349/128 |
| 6,784,949 B1 * | 8/2004 | Nagata et al. | 349/39 |
| 6,894,734 B1 | 5/2005 | Ihara | |
| 2001/0052889 A1 | 12/2001 | Fukunishi | |

(Continued)

FOREIGN PATENT DOCUMENTS

CN 1157633 C 7/2004

(Continued)

OTHER PUBLICATIONS

Chinese Office Action dated Feb. 28, 2011 issued in corresponding Chinese Application No. 20088008839.2.

*Primary Examiner* — Lucy Chien
(74) *Attorney, Agent, or Firm* — Birch, Stewart, Kolasch & Birch, LLP

(57) ABSTRACT

A display panel includes: pairs of electrodes each forming an auxiliary capacitor (Cs2) by overlapping each other, wherein one electrode of each pair of the electrodes is an electrode (79) to have a picture element electrode potential, and the other one electrode of each pair of the electrodes is an auxiliary capacitor electrode (91); and auxiliary capacitor bus lines (CSLj+1) for applying voltages to the auxiliary capacitor electrodes (91), respectively each auxiliary capacitor electrode (91) being provided on an upper side of a corresponding auxiliary capacitor bus line (CSLj+1) in a film thickness direction and being connected with the corresponding auxiliary capacitor bus line (CSLj+1) through a contact hole (82), and each electrode (79) to have the picture element electrode potential being provided on an upper side of the auxiliary capacitor electrode (91) paired therewith, in the film thickness direction. This makes it possible to achieve a display panel in which the variation in the auxiliary capacitance within substrates can be minimized even if the auxiliary bus line is patterned by wet etching.

16 Claims, 21 Drawing Sheets

U.S. PATENT DOCUMENTS

| | | |
|---|---|---|
| 2003/0227429 A1 | 12/2003 | Shimoshikiryo |
| 2005/0162599 A1 | 7/2005 | Kurihara et al. |
| 2005/0213015 A1 | 9/2005 | Shimoshikiryo |
| 2006/0256271 A1 | 11/2006 | Shimoshikiryo |
| 2007/0158729 A1 | 7/2007 | Yang et al. |
| 2008/0192161 A1 | 8/2008 | Kurihara et al. |

FOREIGN PATENT DOCUMENTS

| | | |
|---|---|---|
| JP | 5-34722 A | 2/1993 |
| JP | 8-13166 A | 1/1996 |
| JP | 8-53781 A | 2/1996 |
| JP | 10-268349 | 10/1998 |
| JP | 11-84416 A | 3/1999 |
| JP | 2000-227611 A | 8/2000 |
| JP | 2000-311891 A | 11/2000 |
| JP | 2002-75959 A | 3/2002 |
| JP | 2004-62146 A | 2/2004 |
| JP | 2004-117695 | 4/2004 |
| JP | 2005-242306 A | 9/2005 |
| JP | 2005-320608 A | 11/2005 |
| JP | 2007-183629 A | 7/2007 |

* cited by examiner

DISPLAY PANEL, DISPLAY DEVICE, AND METHOD FOR MANUFACTURING DISPLAY PANEL

TECHNICAL FIELD

The present invention relates to formation of an auxiliary capacitor electrode of a display panel.

BACKGROUND ART

For an active matrix type liquid crystal display device, an auxiliary capacitance is added to a liquid crystal capacitance for achieving stability of a charge held in a picture element.

FIG. 12 is a plan view illustrating an example of a structure of a picture element, to which the auxiliary capacitance is to be added. In this structure, one picture element includes two sub picture elements. Such a structure of the picture element is described, for example, in Patent Literature 1.

A picture element PIXjk, which is driven by a j-th gate bus line GLj and a k-th source bus line SLk, includes a sub picture element P1 and a sub picture element P2 that are disposed symmetrically with respect to the gate bus line GLj, and along a direction that the source bus line SLk extends toward the gate bus line GLj. Here, a sub picture element positioned on a gate bus line GLj-1 side with respect to the gate bus line GLj is referred to as the sub picture element P1, whereas a sub picture element positioned on a gate bus line GLj+1 side with respect to the gate bus line GLj is referred to as the sub picture element P2. The sub picture element P1 includes a TFT 114(1), and the sub picture element P2 includes a TFT 114(2).

The TFT 114(1) includes a gate electrode 114(1)g which is connected to the gate bus line GLj, and a source electrode 114(1)s which is connected to the source bus line SLk. The TFT 114(1) further includes a drain electrode 114(1)d, which is connected to a picture element electrode 109 of the sub picture element P1 through a contact hole 111 provided above the drain electrode 114(1)d. The TFT 114(2) includes a gate electrode 114(2)g which is connected to the gate bus line GLj, and a source electrode 114(2)s which is connected to the source bus line SLk. The TFT114(2) further includes a drain electrode 114(2)d, which is connected to the picture element electrode 109 of the sub picture element P2 through the contact hole 111 provided above the drain electrode 114(2)d.

Further, an auxiliary capacitor bus line CSLj+1 is provided between the gate bus line GLj and the gate bus line GLj+1 so that the auxiliary capacitor bus line CSLj+1 extends parallel to the gate bus line GLj and the gate bus line GLj+1. In the sub picture element P2 of the picture element PIXjk, the picture element electrode 109 has an edge section facing toward the gate bus line GLj+1 and this edge overlaps with the auxiliary capacitor bus line CSLj+1 so as to form an auxiliary capacitor Cs2 therebetween. Furthermore, in a sub picture element P1 of a picture element PIX(j+1)k, the picture element electrode 109 has an edge section facing toward the gate bus line GLj and this edge section overlaps with the auxiliary capacitor bus line CSLj+1 so as to form an auxiliary capacitor Cs1 therebetween. Similarly, in a sub picture element P1 of the picture element PIXjk, the picture element electrode 109 has an edge section facing toward a gate bus line GLj-1 (not illustrated) and this edge section overlaps with an auxiliary capacitor bus line CSLj (not illustrated) so as to form an auxiliary capacitor Cs1 therebetween. The other sub picture elements are similarly configured.

FIG. 13 illustrates an equivalent circuit of the structure of the picture element of FIG. 12. The sub picture element P1 of each picture element includes a capacitor constituted from a liquid crystal capacitor CL1 and the auxiliary capacitor Cs1, whereas the sub picture element P2 of each picture element includes a capacitor constituted from a liquid crystal capacitor CL2 and the auxiliary capacitor Cs2. The liquid crystal capacitor CL1 and the liquid crystal capacitor CL2 are respectively formed between (i) the picture element electrode 109 of the sub picture element to which the liquid crystal capacitor CL1 or the liquid crystal capacitor CL2 belongs and (ii) a common electrode to which a voltage Vcom is applied.

The picture element PIXjk is configured such that the TFT114(1) and the TFT114(2) become conductive at the same time when a selective voltage is applied to the gate bus line GLj. At this point, a voltage of a data signal being supplied to the source bus line SLk is written to the picture element electrode 109 of each of the sub picture elements P1 and P2. The auxiliary capacitor bus line CSLj and the auxiliary capacitor bus line CSLj+1 are driven by, for example, binary voltages in opposite phases. Accordingly, even if the same data signal is supplied from the source bus line SLk to the sub picture elements P1 and P2, each of the liquid crystal capacitors CL1 and CL2 applies a different voltage to a liquid crystal layer. As a result, it is possible for each of the sub picture elements P1 and P2 to achieve different display brightness, thereby achieving excellent visual characteristics of the picture element PIXjk as a whole.

FIG. 14 is a cross-sectional view taken along the line A-A' of FIG. 12. Patterned on a transparent substrate 101 are the gate electrode 114(2)g of the TFT 114(2), the auxiliary capacitor bus line CSLj+1, and a gap adjusting layer 102, each of which is made of a gate metal layer that is a laminate film of Ti/Al/Ti. Further, although not illustrated, the gate bus line GLj is also patterned on the transparent substrate 101 by using the gate metal layer. Then, on these patterns, a gate insulating film 103 is formed so that the patterns are covered with the gate insulating film 103. Above the gate electrode 114(2)g, a semiconductor layer 104 made of an intrinsic semiconductor layer (i-layer) and a semiconductor layer 105 made of a silicon n$^+$ layer (ohmic contact layer) are stacked in this order on the gate insulating film 103 in positions each of which corresponds to a source region and a drain region. Further, formed on the semiconductor layers 104 and 105 so as to cover the semiconductor layers 104 and 105 are: the source bus line SLk, the source electrode 114(2)s, and the drain electrode 114(2)d, each of which is made of a source metal formed by stacking a first source metal layer 106 made of Ti and a second source metal layer 107 made of Al in this order. The drain electrode 114(2)d is provided so that it reaches a position above the gap adjusting layer 102.

Furthermore, a passivation film 108 made of SiN$_x$ is formed so that the passivation film 108 covers the substrate on which the source electrode 114(2)s and the drain electrode 114(2)d are formed. Formed on the passivation film 108 is the picture element electrode 109 made of an ITO (transparent electrode). The picture element electrode 109 is connected to the drain electrode 114(2)d through the contact hole 111 formed on the passivation film 108. The contact hole 111 includes an etching aperture of the drain electrode 114(2)d and a through hole formed on the gate insulating film 103, and reaches a top surface of the gap adjusting layer 102. As such, the picture element electrode 109 makes contact also with the top surface of the gap adjusting layer 102.

The auxiliary capacitor bus line CSLj+1 overlaps the picture element electrode 109 so as to form the auxiliary capacitor Cs2. Here, the auxiliary capacitor Cs2 is a capacitor $C_{GI+PAS}$, whose dielectric material is a laminate film made of the gate insulating film (GI) 103 and an interlayer insulating film (PAS) 108.

Next, a manufacturing process of the structure of FIG. 14 is described with reference to FIGS. 15 and 16. It should be noted that the transparent substrate 101 is not illustrated in FIGS. 15 and 16.

First in step 1, as shown in (a) of FIG. 15, the gate metal layer GM made of the laminate film of Ti/Al/Ti is formed on the transparent substrate 101 by sputtering. Next in step 2, as shown in (b) of FIG. 15, a photoresist is patterned so that it remains on a part of the gate metal layer GM, which part is desired to remain on the transparent substrate 101. Here, the photoresist is patterned by performing exposure, development, and post-bake in this order (the photoresist is patterned in this manner also in the after-described processing steps). Then, by using the photoresist as an etching mask, the gate metal layer GM is wet-etched with etchant containing a mixture solution of hydrofluoric acid and nitric acid, a mixture solution of hydrofluoric acid and hydrogen peroxide, or the like, thereby forming the gate electrode 114(2)g, the auxiliary capacitor bus line CSLj+1, and the gap adjusting layer 102. Such a wet etching method may be selected from methods described in Patent Literatures 3 to 7, by which methods a Ti alloy or a metal containing Ti is etched. Since such methods have a high etching rate, etching uniformity is preferably increased by, for example, stirring the etchant or spraying the etchant. Further, an often-used etching method other than the wet etching method is a dry etching method, in which a reactive ion etching using chlorine gas is performed.

Next in step 3, as shown in (c) of FIG. 15, the gate insulating film 103 is formed. On the gate insulating film 103, the intrinsic semiconductor layer, which will become the semiconductor layer 104, and the n$^+$ silicon layer, which will become the semiconductor layer 105, are grown in succession. Then in step 4, as shown in (d) of FIG. 15, the photoresist is patterned. By using the photoresist as the etching mask, the silicon n$^+$ layer and the intrinsic semiconductor layer are etched so as to form (i) the semiconductor layer 104 and (ii) the semiconductor layer 105 which is not yet separated into the source region and the drain region. Subsequently in step 5, as shown in (e) of FIG. 15, a Ti film, which will become the first source metal layer 106, and an Al film, which will become the second source metal layer 107, are formed all over by sputtering, and thereafter, the photoresists are patterned so as to form the source bus line SLk and to separate the source region and the drain region of the TFT 114(2). In performing this patterning, it is necessary to also form an etching window in a region on which the contact hole 111 is to be formed. In this regard, since there is the gap adjusting layer 102 provided beneath the region on which the contact hole 111 is to be formed, it is possible to pattern the etching window in the substantially same plane as the other patterns. Further, the gap adjusting layer 102 makes it possible to stop the etching at the Ti film formed on a top surface of the gap adjusting layer 102 by utilizing a difference in etching rate, in a case where the contact hole 111 is made deeper to the gate insulating film 103.

Then in step 6, as shown in (a) of FIG. 16, by using the photoresists as the etching masks, the Al film is etched selectively against the Ti film with phosphoric acid or the like. Next in step 7, as shown in (b) of FIG. 16, by using the above photoresists as the etching masks, the Ti film is dry-etched by the reactive ion etching using the chlorine gas. Here, in the TFT 114(2) region, the n$^+$ silicon layer is also etched at the same time. As a result, the first source metal layer 106 and the second source metal layer 107 are formed, thereby obtaining the source bus line SLk, the source electrode 114(2)s, and the drain electrode 114(2)d.

Next in step 8, as shown in (c) of FIG. 16, the passivation film 108 is formed all over by CVD, and the photoresist is patterned so as to form the contact hole 111. Further in step 9, as shown in (d) of FIG. 16, the passivation film 108 and the gate insulation film 103 are dry-etched by the reactive ion etching using the chlorine gas. As a result, the contact hole 111 is formed. Then in step 10, as shown in (e) of FIG. 16, the picture element electrode 109 is formed on the passivation film 108 and on an inner surface of the contact hole 111.

Furthermore, Patent Literature 2 also discloses the same structure.

Citation List

Patent Literature 1

Japanese Patent Application Publication, Tokukai, No. 2004-62146 A (Publication Date: Feb. 26, 2004)

Patent Literature 2

Japanese Patent Application Publication, Tokukai, No. 2005-242306 A (Publication Date: Sep. 8, 2005)

Patent Literature 3

Japanese Patent Application Publication, Tokukai, No. 2005-320608 A (Publication Date: Nov. 17, 2005)

Patent Literature 4

Japanese Patent Application Publication, Tokukaihei, No. 8-13166 A (Publication Date: Jan. 16, 1996)

Patent Literature 5

Japanese Patent Application Publication, Tokukaihei, No. 8-53781 A (Publication Date: Feb. 27, 1996)

Patent Literature 6

Specification of U.S. Pat. No. 4,554,050 (Publication Date: Nov. 19, 1985)

Patent Literature 7

Japanese Patent Application Publication, Tokukai, No. 2000-311891 A (Publication Date: Nov. 7, 2000)

Patent Literature 8

Japanese Patent Application Publication, Tokukai, No. 2002-75959 A (Publication Date: Mar. 15, 2002)

SUMMARY OF INVENTION

However, in the manufacturing processes of FIGS. 15 and 16, in a case where the gate metal layer GM is wet-etched so as to concurrently pattern the gate bus line, the gate electrode, and the auxiliary capacitor bus line, an etching shift amount of a line width largely varies as the number of substrates processed increases, due to isotropy of the etching. This variation leads to a change in a γ characteristic (voltage-transmittance curve).

The etching shift amount of the line width is a side-etching amount directly under a photoresist, which serves as an etching mask. The side-etching amount depends on a concentration of an etchant for wet etching and is periodically adjusted; however, it is difficult to always keep the side-etching amount constant, and therefore the side-etching amount largely varies depending on the number of substrates processed. Thus, a deviation range of the side-etching amount expands as the number of substrates processed increases. Such an etching shift amount of the line width is within the order of about 4 μm to about 6 μm.

FIG. 17 is a graph indicating how deviation of the line width of the auxiliary capacitor bus line from a desired value affects an auxiliary capacitor Cs. On a horizontal axis named "Line width shift of auxiliary capacitor bus line", positive value indicates an increment of the line width, whereas negative value indicates a decrement of the line width. A vertical axis named "Cs ratio" indicates a ratio (Cs/Cpix) of the auxiliary capacitor Cs with respect to a capacitance Cpix of one whole sub picture element.

FIG. 18 shows a graph indicating how the deviation of the line width of the auxiliary capacitor bus line from the desired value affects a Cs voltage shift. The Cs voltage shift indicates variation of effective values of voltage applied to a liquid crystal capacitor CL (CL1 for a sub picture element P1, CL2 for a sub picture electrode P2) during one frame period, when potential of a picture element electrode 109 is varied by the auxiliary capacitor Cs (Cs1 for the sub picture element P1, Cs2 for the sub picture element P2). The Cs voltage shift is 2.05 V when the line width of the auxiliary capacitor bus line is the desired value. The Cs voltage shift is deviated by approximately 20 mV to 30 mV when the line width is deviated by 0.4 µm.

FIG. 19 shows a graph indicating how the γ characteristic of the display varies depending on the Cs voltage shift of FIG. 18. The graph shows that the γ characteristic changes if the Cs voltage shift changes.

As described above, a conventional liquid crystal display device has had a problem in that the auxiliary capacitance varies among the panels and therefore the γ characteristic of the display deviates from a designed value, when the auxiliary capacitor bus line is formed concurrently with the gate bus line and the gate electrode by a wet etching method. This means that a gray scale difference occurs among individual panels in a case where a standardized driving circuit is employed, the gray scale difference being a cause of gray scale deterioration. The problem is, the gray scale deterioration largely affects display quality.

Instead of the wet etching method, it is possible to use a dry etching method, which is capable of anisotropic etching in which the etching proceeds in a direction perpendicular to a surface of a substrate, for minimizing the line width (deviation of the auxiliary capacitance). However, the wet etching method has such an advantage that there is no dust (e.g., etching dust) generated and therefore productivity is high in comparison with the dry etching method.

The present invention is made in view of the above-described conventional problems, and it is an object of the present invention to achieve (i) a display panel that is capable of preventing variation in the auxiliary capacitance among the panels even if the auxiliary capacitor bus line is patterned by the wet etching, (ii) a display device employing the display panel, and (iii) a method for manufacturing the display panel and the display device.

In order to attain the object, the display panel of the present invention is an active matrix type display panel including: pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and auxiliary capacitor bus lines for applying voltages to the auxiliary capacitor electrodes, respectively each auxiliary capacitor electrode being provided on an upper side of a corresponding auxiliary capacitor bus line in a film thickness direction and being connected with the corresponding auxiliary capacitor bus line through a contact hole, and each electrode to have the picture element electrode potential being provided on an upper side of the auxiliary capacitor electrode paired therewith, in the film thickness direction.

In this invention, the auxiliary capacitor electrode that overlaps the electrode to have the picture element electrode potential so as to form the auxiliary capacitor is located on a lower side of the electrode to have the picture element electrode potential and on an upper side of the auxiliary capacitor bus line, so that the auxiliary capacitor electrode is in contact with the auxiliary capacitor bus line. Accordingly, even if the auxiliary capacitor bus line is patterned by wet etching, it is possible to form the auxiliary capacitor electrode by any process; that is, it becomes possible to pattern the auxiliary capacitor electrode by dry etching. Patterning the auxiliary capacitor electrode by dry etching makes it possible to minimize variation in pattern size of the auxiliary capacitor electrode, and therefore, possible to minimize variation in the auxiliary capacitance among the panels.

As such, the present invention makes it possible to achieve a display panel that is capable of minimizing the variation in the auxiliary capacitance among the panels even if the auxiliary capacitor bus line is patterned by wet etching.

In order to attain the object, the display panel of the present invention is configured such that the auxiliary capacitor bus lines are formed in a same layer as scanning signal lines, in a laminated structure of the display panel.

This invention makes it possible to apply a configuration in which the auxiliary capacitor electrode can be patterned by dry etching to a display panel in which the auxiliary capacitor bus line can be patterned concurrently with the scanning signal line by wet etching.

In order to attain the object, the display panel of the present invention is configured such that the auxiliary capacitor bus lines are formed from a same material as that of the scanning signal lines.

This invention makes it possible to apply a configuration in which the auxiliary capacitor electrode can be patterned by dry etching to a display panel in which the auxiliary capacitor bus line can be patterned concurrently with the scanning signal line under the same condition as that of the scanning signal line by wet etching.

In order to attain the object, the display panel of the present invention is configured such that the auxiliary capacitor electrodes are formed in a same layer as data signal lines, in the/a laminated structure of the display panel.

This invention makes it possible to pattern the auxiliary capacitor electrodes concurrently with the data signal lines.

In order to attain the object, the display panel of the present invention is configured such that the auxiliary capacitor electrodes are formed from a same material as that of the data signal lines.

This invention makes it possible to pattern the auxiliary capacitor electrodes concurrently with the data signal lines with use of the same material as that of the data signal lines.

In order to attain the object, the display panel of the present invention further including picture elements each of which includes a plurality of sub picture elements that share one scanning signal line and one data signal line, the sub picture elements each being provided with the auxiliary capacitors, respectively.

This invention makes it possible to let each of the sub picture elements have a different brightness by applying different voltages to the auxiliary capacitor bus line of each of the sub picture elements while supplying the same data signal to each of the sub picture elements. Accordingly, it is possible to overcome irregularity of the γ characteristic among the panels caused by variation in the auxiliary capacitance in a configuration of high-quality display that is capable of improving a visual characteristic of a whole picture element. As a result, it is possible to keep high display quality without gray scale deterioration.

In order to attain the object, the display panel of the present invention is configured such that each picture element includes a first sub picture element and a second sub picture element as the plurality of sub picture elements, the first sub picture element and the second sub picture element being disposed adjacent with each other across the one scanning line along a panel surface, the auxiliary capacitor bus lines are provided between the scanning signal lines, and each picture element being adjacent with each other in such a manner that the first sub picture element of each picture element shares a corresponding auxiliary capacitor bus line with the second sub picture element of a picture element being adjacent to the picture element along a direction in which the data signal lines extend, the corresponding auxiliary capacitor bus line being provided between scanning signal lines respectively corresponding to the picture element and the picture element adjacent to the picture element along the direction.

In a case where the auxiliary capacitor of the first sub picture element and the auxiliary capacitor of the second sub picture element are individually configured in each picture element, if the first sub picture element of each picture element shares a same auxiliary capacitor bus line with the second sub picture element of a picture element being adjacent to the picture element and if the auxiliary capacitor bus line is used as the auxiliary capacitor electrode, process variation occurs. The process variation causes difficulty in forming both of the auxiliary capacitors as they are designed.

However, in this invention, each of the auxiliary capacitors is formed by use of the auxiliary capacitor electrode formed on an upper side of the auxiliary capacitor bus line. Therefore, even if the auxiliary capacitor bus line is supplied, it is possible to easily form the auxiliary capacitors individually as they are designed.

In order to attain the object, the display panel of the present invention is configured such that the electrodes to have the picture element electrode potential are picture element electrodes, and the display panel comprises: a selective element per picture element; and one or more insulating films between the picture element electrodes and the auxiliary capacitor electrodes, the one or more insulating films covering the selective elements from above.

This invention makes it possible to utilize, as a dielectric film of the auxiliary capacitor via which the two electrodes are opposed to each other, a film being in use for the other purposes.

In order to attain the object, the display panel of the present invention is a liquid crystal display panel driven by a VA mode.

This invention makes it possible to minimize variation in the auxiliary capacitance in a liquid crystal display panel that is driven by the VA mode, which is excellent in black display and in a viewing angle characteristic. Therefore, it is possible to achieve extremely stable high quality display.

In order to attain the object, the display panel of the present invention is configured such that the electrodes to have the picture element electrode potential are auxiliary capacitor counter electrodes respectively connected with picture element electrodes therebelow via corresponding contact holes, and the display panel comprises: a selective element per picture element; and one or more insulating films between the picture element electrodes and the auxiliary capacitor electrodes, the one or more insulating films covering the selective elements from above.

This invention makes it possible to utilize, as a dielectric film of the auxiliary capacitor via which two electrodes are opposed to each other, part of a film being in use for the other purposes.

In order to attain the object, the display panel of the present invention is a liquid crystal display panel driven by a TN mode.

This invention makes it possible to minimize variation in the auxiliary capacitance in a liquid crystal display panel that is driven by the TN mode.

In order to attain the object, the display panel of the present invention further includes: TFTs as the selective elements of the picture elements or as selective elements of picture elements, wherein the contact holes connecting the auxiliary capacitor bus lines with the auxiliary capacitor electrodes respectively are formed in an insulating film or the one or more insulating films, and the insulating film or the one or more insulating films are part of a film constituting a gate insulating film of each TFT.

This invention makes it possible to utilize, as an insulation film on which the contact holes connecting the auxiliary capacitor bus lines with the auxiliary capacitor electrodes, part of a film being in use for the other purposes.

In order to attain the object, the display device of the present invention includes the display panel described above.

This invention makes it possible to achieve a display device that is capable of high quality display with minimum variation in the auxiliary capacitance.

In order to attain the object, the method of the present invention for manufacturing the display panel described above, the method includes: performing wet etching to pattern a first metal layer into scanning signal lines and the auxiliary capacitor bus lines, concurrently, the first metal layer being formed on an insulating substrate; forming a first insulating film on pattern surfaces of the auxiliary capacitor bus lines and the scanning signal lines; forming a second metal layer on the first insulating film; performing dry etching to the second metal layer, so as to pattern the second metal layer into data signal lines and the auxiliary capacitor electrodes, concurrently, and so as to connect the auxiliary capacitor electrodes with the auxiliary capacitor bus lines through contact holes of the first insulating film respectively; and forming the electrodes to have the picture electrode potential, above the auxiliary capacitor electrodes in such a manner that the electrodes to have the picture electrode potential and the auxiliary capacitor electrodes sandwich a second insulating film.

This invention makes it possible to pattern the auxiliary capacitor electrode concurrently with the data signal line with use of the same material as that of the data signal line by dry etching, while the auxiliary bus line is patterned concurrently with the scanning signal line with use of the same material as that of the scanning signal line by wet etching as has been the case conventionally.

In order to attain the object, the method of the present invention for manufacturing the display panel described above, the method includes: performing wet etching to pattern a first metal layer into scanning signal lines and the auxiliary capacitor bus lines, concurrently, the first metal layer being formed on an insulating substrate; forming a first insulating film on pattern surfaces of the auxiliary capacitor bus lines and the scanning signal lines; forming a second metal layer on the first insulating film, the second metal layer being a laminate film; performing dry etching to at least a lowest-layer film of the second metal layer, so as to pattern the second metal layer into data signal lines and the auxiliary capacitor electrodes, concurrently, and so as to connect the auxiliary capacitor electrodes with the auxiliary capacitor bus lines through contact holes of the first insulating film respectively; and forming the electrodes to have the picture electrode potential, above the auxiliary capacitor electrodes in such a manner that the electrodes to have the picture electrode potential and the auxiliary capacitor electrodes sandwich a second insulating film.

This invention makes it possible to pattern the auxiliary capacitor electrode concurrently with the data signal line with use of the same material as that of the data signal line by dry-etching at least the undermost layer, while the auxiliary capacitor bus line is patterned concurrently with the scanning signal line with use of the same material as that of the scanning signal line by wet etching as has been the case conventionally.

In order to attain the object, the method for manufacturing the display panel described above, the method includes: forming a first insulating film on pattern surfaces of scanning signal lines and the auxiliary capacitor bus lines; forming a second metal layer on the first insulating film, the second metal layer being a laminate film; patterning the second metal layer into a metal layer pattern including patterns of the auxiliary capacitor electrodes; and aligning a pattern of a transparent electrode to the metal layer pattern by a lens-scanning method or a stepper method with use of the metal layer pattern as a position reference, the transparent electrode and the metal layer pattern sandwiching a second insulating film therebetween.

This invention is configured such that the picture element electrode pattern is aligned with respect to the metal layer pattern formed from the second metal layer located on an upper side of the pattern faces of the scanning signal line and the auxiliary capacitor bus line. Therefore, if for example a pattern other than the auxiliary capacitor electrode, such pattern as a source bus line, is also formed from the second metal layer in advance, it is possible to align the picture element electrode pattern only with respect to the second metal layer. In other words, it is possible to perform a single-layer alignment. Further, deviation of the pattern size of the auxiliary capacitor electrode is minimized. This makes it possible to improve accuracy of exposure, thereby improving mass productivity of the display panel.

For a fuller understanding of the nature and advantages of the invention, reference should be made to the ensuing detailed description taken in conjunction with the accompanying drawings.

BRIEF DESCRIPTION OF DRAWINGS

FIG. 1, showing an embodiment of the present invention, is a cross-sectional view illustrating a first structure of a picture element of a display panel.

FIG. 2 is a plan view illustrating a structure of the picture element of the display panel of FIG. 1.

FIG. 3 is a flow diagram illustrating a first-half of a method for manufacturing a display panel including the picture element structured as shown in FIG. 1. (a) to (e) of FIG. 3 show cross-sectional views of the display panel in each step of the method.

FIG. 4 is a flow diagram illustrating a second-half of the method for manufacturing the display panel including the picture element structured as shown in FIG. 1. (a) to (e) of FIG. 4 show cross-sectional views of the display panel in each step of the method.

FIG. 5, showing an embodiment of the present invention, is a cross-sectional view illustrating a second structure of a picture element of a display panel.

FIG. 6 is a plan view illustrating a structure of the picture element of the display panel of FIG. 5.

FIG. 7 is a flow diagram illustrating a method for manufacturing the display panel including the picture element of FIG. 5. (a) to (f) of FIG. 7 show cross-sectional views of the display panel in each step of the method.

FIG. 8, showing an embodiment of the present invention, is a cross-sectional view illustrating a third structure of a picture element of a display panel.

FIG. 9 is a cross-sectional view taken along the line A-A' of the picture element of FIG. 8.

FIG. 10 is a cross-sectional view taken along the line B-B' of the picture element of FIG. 8.

FIG. 11 is a circuit block diagram showing a configuration of a display panel of the present invention.

FIG. 12, showing a conventional art, is a plan view illustrating a picture element of a conventional display panel.

FIG. 13 is a circuit diagram showing an equivalent circuit of the picture element of FIG. 12.

FIG. 14 is a cross-sectional view taken along the line A-A' of the picture element of FIG. 12.

FIG. 15 is a flow diagram illustrating a first-half of a method for manufacturing the display panel including the picture element of FIG. 14. (a) to (e) of FIG. 15 show cross-sectional views of the display panel in each step of the method.

FIG. 16 is a flow diagram illustrating a second-half of the method for manufacturing the display panel including the picture element of FIG. 14. (a) to (e) of FIG. 16 show cross-sectional views of the display panel in each step of the method.

FIG. 17 is a graph showing a relation between auxiliary capacitance ratio and line width shift of an auxiliary capacitor bus line.

FIG. 18 is a graph showing a relation between Cs voltage shift and the line width shift of the auxiliary capacitor bus line.

FIG. 19 is a graph describing how a difference in the Cs voltage shift affects a γ characteristic.

FIG. 20 is a view showing how conventional alignment is performed in a lens-scanning type exposure.

FIG. 21 is a view showing how alignment of the present embodiment is performed in the lens-scanning type exposure.

EXPLANATION OF REFERENTIAL NUMERALS

1 Display Panel
15 Isolated Electrode (Auxiliary Capacitor Electrode)
16 Picture Element Electrode
41 Auxiliary Capacitor Counter Electrode
43 Isolated Electrode (Auxiliary Capacitor Electrode)
45 Picture Element Electrode
79 Picture Element Electrode
91 Isolated Electrode (Auxiliary Capacitor Electrode)

SL1 through SLn Source Bus Lines (Data Signal Lines)
GL1 through GLm Gate Bus Lines (Scanning Signal Lines)
PIX Picture Element

DESCRIPTION OF EMBODIMENTS

An embodiment of the present invention is described as follows with reference to FIGS. 1 to 11, and FIGS. 20 and 21.

Figure 11:
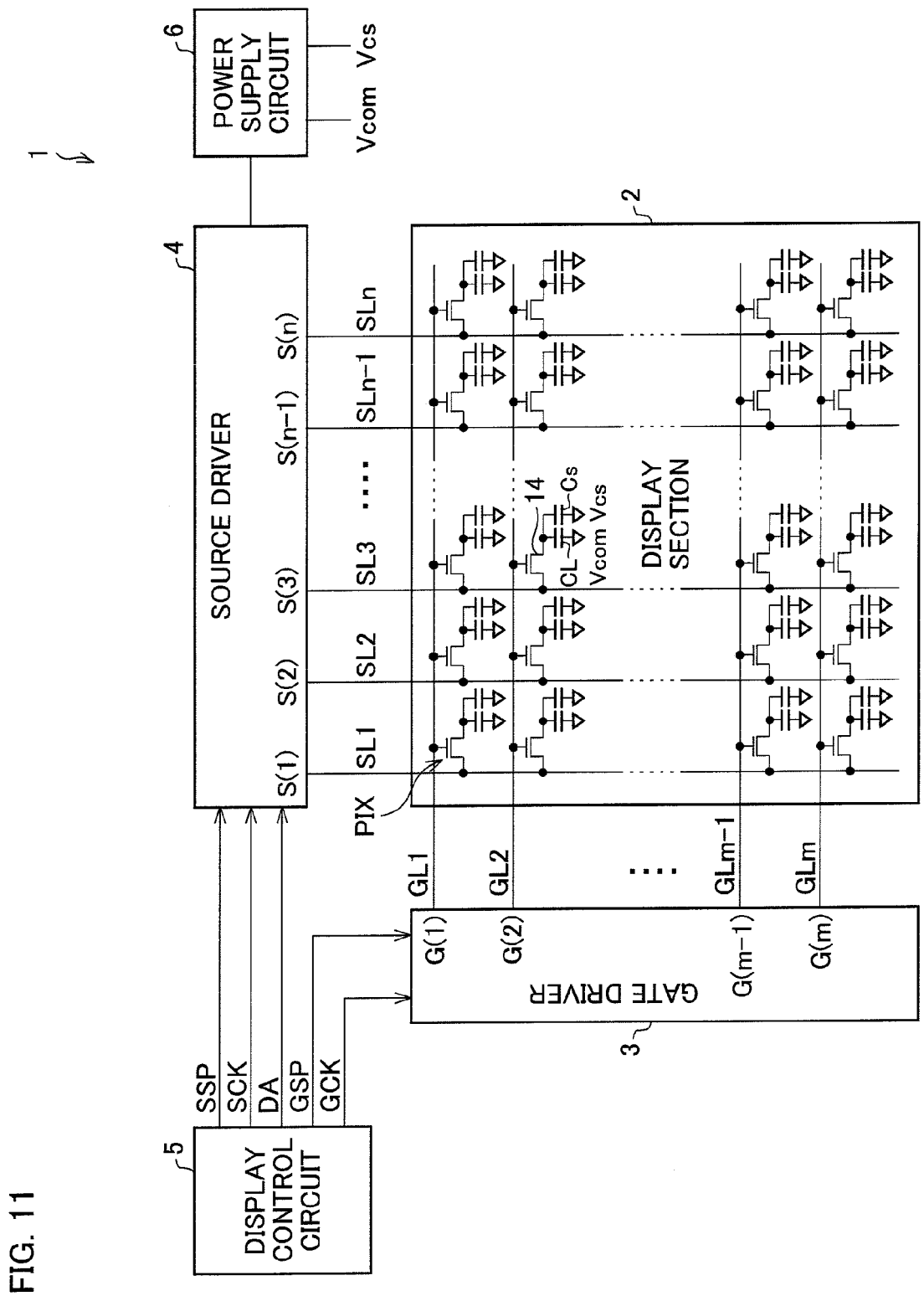
FIG. 11
Figure 12:
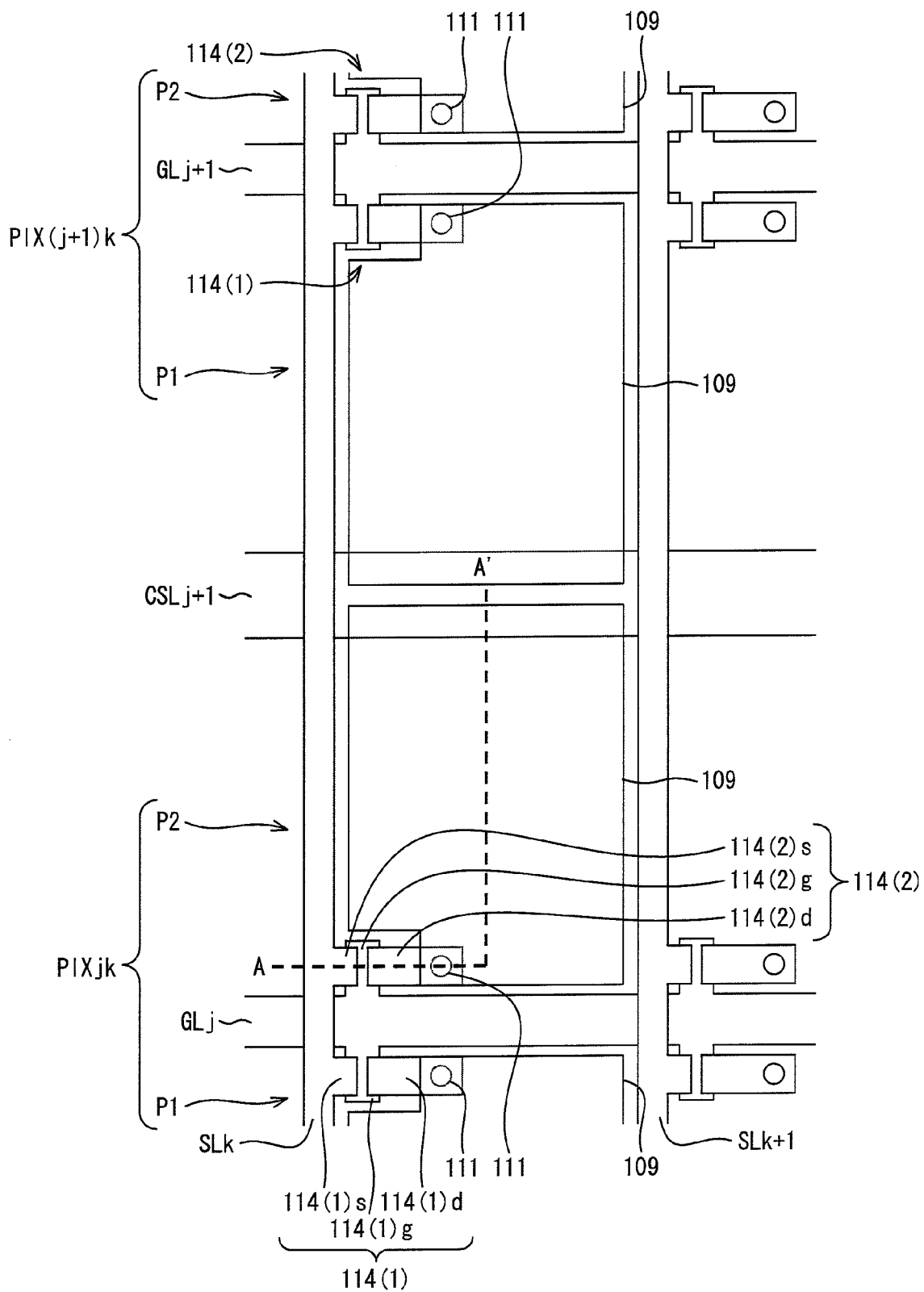
FIG. 12

FIG. 11 shows a configuration of a display panel 1 of a liquid crystal display device (display device) according to the present invention.

The display panel 1 is an active matrix type liquid crystal display device, which includes: a gate driver 3 serving as a scanning signal line drive circuit; a source driver 4 serving as a data signal line drive circuit; a display section 2; a display control circuit 5 for controlling the gate driver 3 and the source driver 4; and a power supply circuit 6.

The display section 2 includes: gate bus lines GL1 to GLm serving as a plurality of scanning signal lines (m-scanning signal lines); source bus lines SL1 to SLn serving as a plurality of data signal lines (n-data signal lines) each of which intersects with each of the gate bus lines GL1 to GLm; and a plurality of picture elements (m×n-picture elements) PIX each of which is located corresponding to each of intersections of the gate bus lines GL1 to GLm and the source bus lines SL1 to SLn. The display section 2 further includes auxiliary capacitor bus lines CSL (not illustrated), which run parallel to the gate bus lines GL1 to GLm. One auxiliary capacitor bus lines CSL is allocated to each row of picture elements, which row consists of the n-picture elements PIX aligned in parallel with the gate bus liens GL1 to GLm (see later-described FIGS. 6 and 8).

The plurality of picture elements PIX are provided in matrix to form a picture element array. Each of the picture elements PIX includes: a TFT (picture element selection element) 14; a liquid crystal capacitor CL; and an auxiliary capacitor Cs. The picture element PIX described here has a typical conceptual structure; this means that the present invention is widely applicable. Detailed structure of the picture elements PIX depends on a function the display panel 1 specifically has; however, the structure does not affect the nature of the present invention. The TFT 14 includes a gate electrode which is connected to the gate bus line GLj ($1 \leq j \leq m$); a source electrode which is connected to the source bus line SLk ($1 \leq k \leq n$); and a drain terminal which is connected to the picture element electrode. The liquid crystal capacitor CL is constituted from: the picture element electrode; a counter electrode; and a liquid crystal layer sandwiched between the picture element electrode and the counter electrode. To the counter electrode, a voltage Vcom is applied from the power supply circuit 6. The auxiliary capacitor Cs is a capacitor that is added to the liquid crystal capacitor CL by use of the auxiliary capacitor bus line CSL. The structure of the auxiliary capacitor Cs is described in Embodiments as set forth below. To the auxiliary capacitor bus lien CSL, a voltage Vcs is applied from the power supply circuit 6.

The display control circuit 5 receives, from an external signal source, signals such as a digital video signal indicative of an image to be displayed, a horizontal sync signal, and a vertical sync signal. Based on these signals, the display control circuit 5 generates and outputs a gate start pulse GSP, a gate clock GCK, a source start pulse SSP, a source clock SCK, a digital video signal DA, and the like.

The gate driver 3 generates, from the gate start pulse GSP and the gate clock GCK that are inputted from the display control circuit 5, scanning signals G(1) to G(m) for sequentially scanning the gate bus lines GL1 to GLm every horizontal period.

From the source start pulse SSP; the source clock SCK; and the digital video signal DA, the source driver 4 generates data signals S(1) to S(n) that are to be line-sequentially outputted to the source bus lines SL1 to SLn every horizontal period. The only source driver connected to the source bus lines SL1 to SLn is the source driver 4, which is connected at one side end of the source bus lines SL1 to SLn. An example of the source driver 4 described here is a digital driver that DA-converts digital video signals into analog signals and then line-sequentially outputs the analog signals to the source bus lines SL1 to SLn; however, the source driver 4 is not limited to this example and may be selected from any drivers such as an analog driver that samples analog video signals and dot-sequentially outputs the analog video signals to the source bus lines SL1 to SLn.

After the gate driver 3 sequentially scans the GL1 to GLm, a data signal S(i) is written, via the TFT 14, to each picture element of the scanned picture element line from the corresponding source bus line SLi. The liquid crystal capacitor CL is given a differential voltage between a voltage of the data signal S(i) written and the voltage Vcom of the counter electrode, and then the picture element performs display with brightness according to the voltage applied. A change in potential of the auxiliary capacitor Cs leads to a change in potential of the picture element electrode; therefore, it is possible to change brightness of the picture element by changing the voltage applied to the liquid crystal capacitor CL.

Next, Embodiments of the auxiliary capacitor Cs are described with reference to examples of the structure of the picture elements PIX of the present embodiment.

Embodiment 1

Figure 1:
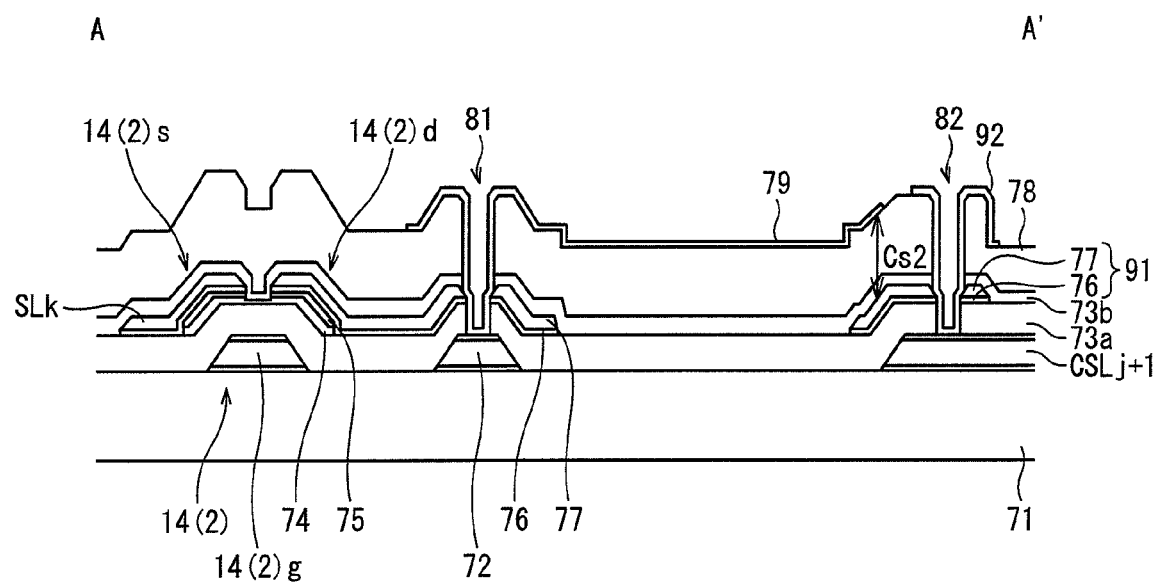
FIG. 1
Figure 2:
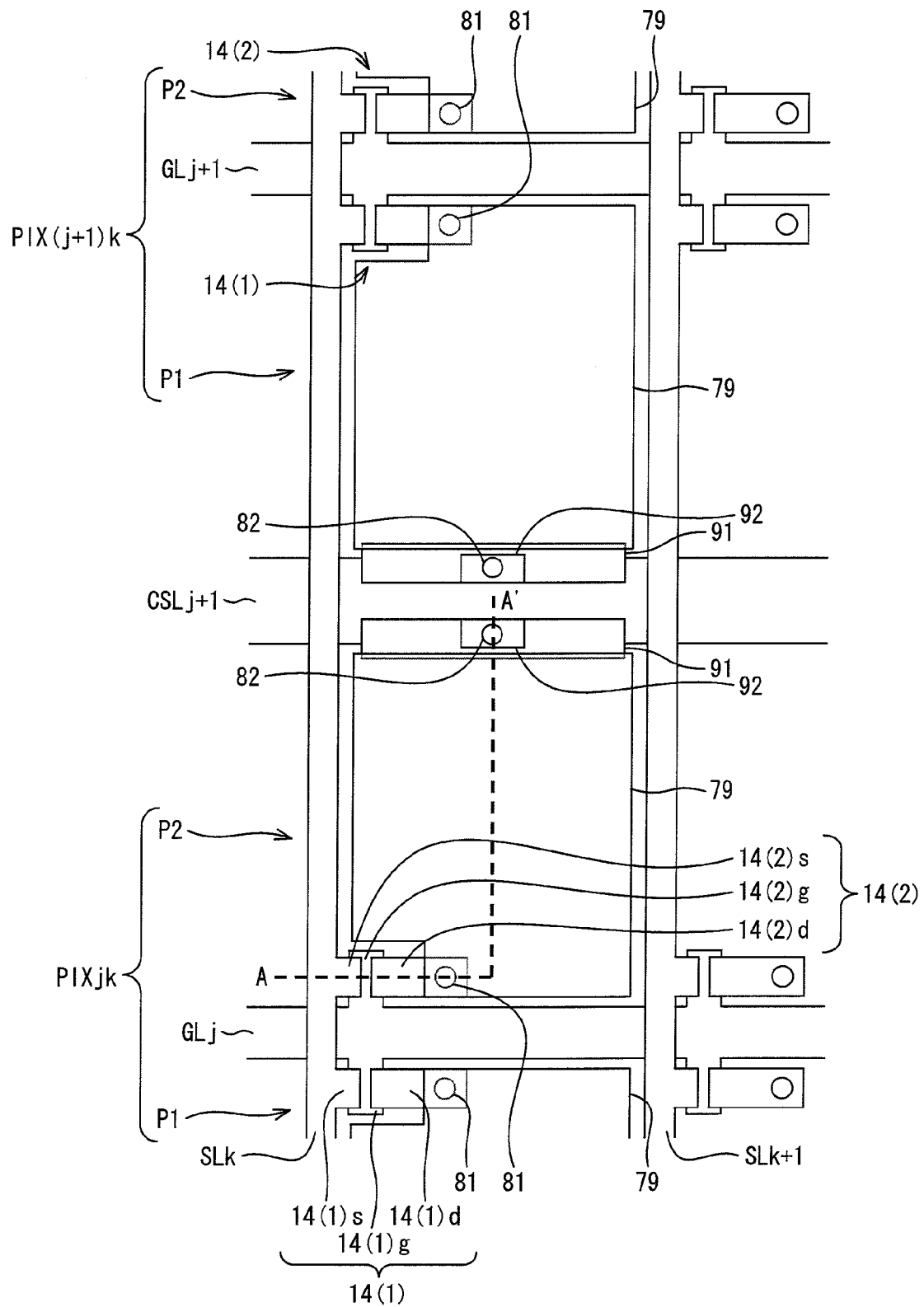
FIG. 2

FIG. 2 is a plan view illustrating picture elements PIX of the present embodiment. FIG. 1 shows a cross-sectional view taken along the line A-A' of FIG. 2.

The picture element PIX of the present embodiment includes two sub picture elements.

A picture element PIXjk, which is driven by a j-th gate bus line GLj and a k-th source bus line SLk, includes a sub picture element P1 and a sub picture element P2 that are disposed symmetrically with respect to the gate bus line GLj, and along a direction that the source bus line SLk extends. Here, a sub picture element positioned on a gate bus line GLj-1 side with respect to the gate bus line GLj is referred to as the sub picture element P1, whereas a sub picture element positioned on a gate bus line GLj+1 side with respect to the gate bus line GLj is referred to as the sub picture element P2. The sub picture element P1 includes a TFT14(1), and the sub picture element P2 includes a TFT14(2).

The TFT14(1) includes a gate electrode 14(1)g which is connected to the gate bus line GLj, and a source electrode 14(1)s which is connected to the source bus line SLk. The TFT14(1) further includes a drain electrode 14(1)d which is connected to, through a contact hole 81 provided above the drain electrode 14(1)d, a picture element electrode 79 of the sub picture element P1. The TFT 14(2) includes a gate electrode 14(2)g which is connected to the gate bus line GLj, and a source electrode 14(2)s which is connected to the source bus line SLk. The TFT 14(2) further includes a drain electrode 14(2)d which is connected to, through the contact hole 81 provided above the drain electrode 14(2)d, the picture element electrode 79 of the sub picture element P2.

Further, an auxiliary capacitor bus line CSLj+1, which extends along a direction parallel to the gate bus line GLj and the gate bus line GLj+1, is provided between the gate bus line GLj and the gate bus line GLj+1. Provided on an upper side (closer to the gate bus line GLj) of the auxiliary capacitor bus line CSLj+1 is an isolated electrode (auxiliary capacitor electrode) 91. The isolated electrode 91 is connected to the auxiliary capacitor bus line CSLj+1 through a contact hole 82. In the sub picture element P2 of the picture element PIXjk, an edge section of the picture element 79 on the gate bus line GLj+1 side overlaps an edge section of the isolated electrode 91 on the gate bus line GLj side so as to form an auxiliary capacitor Cs2. The contact hole 82 is formed to penetrate through a foundation layer of the picture element electrode 79. The isolated electrode 91 and the auxiliary capacitor bus line CSLj+1 are connected with each other via a connection electrode 82, which is formed in the same layer as the picture element electrode 79.

A sub picture element P1 of a picture element PIX(j+1) is structured in the same manner; that is, an edge section of the picture element 79 on the gate bus line GLj side overlaps an edge section of the isolated electrode 91 on the gate bus line GLj+1 side so as to form an auxiliary capacitor Cs1. Similarly, in the sub picture element P1 of the picture element PIXjk, an edge section of the picture element 79 on a gate bus line GLj-1 (not illustrated) side overlaps an edge section of an auxiliary capacitor bus line CSLj (not illustrated) on the gate bus line GLj side so as to form an auxiliary capacitor Cs1. The other sub picture elements are similarly configured.

Figure 13:
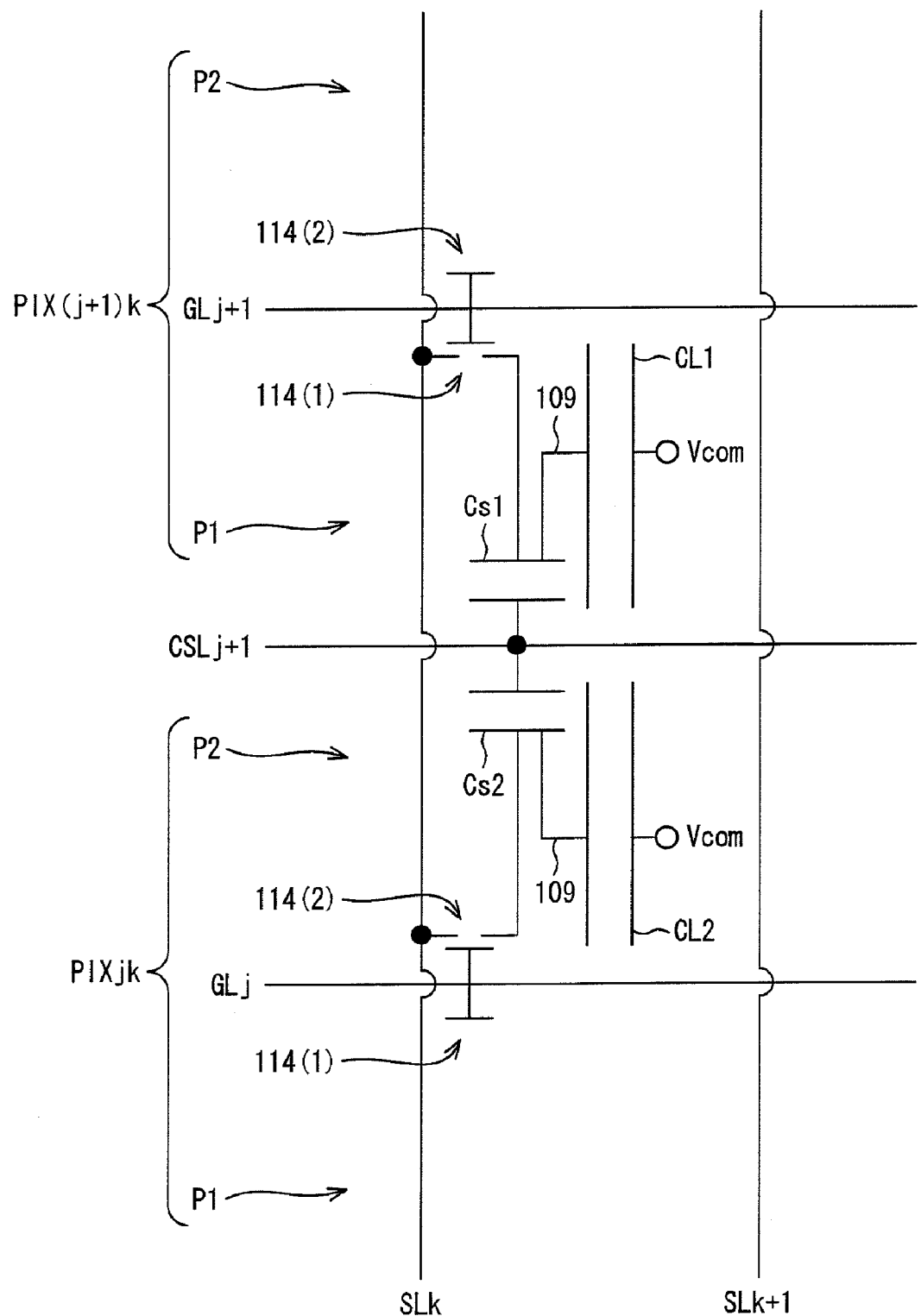
FIG. 13
Figure 14:
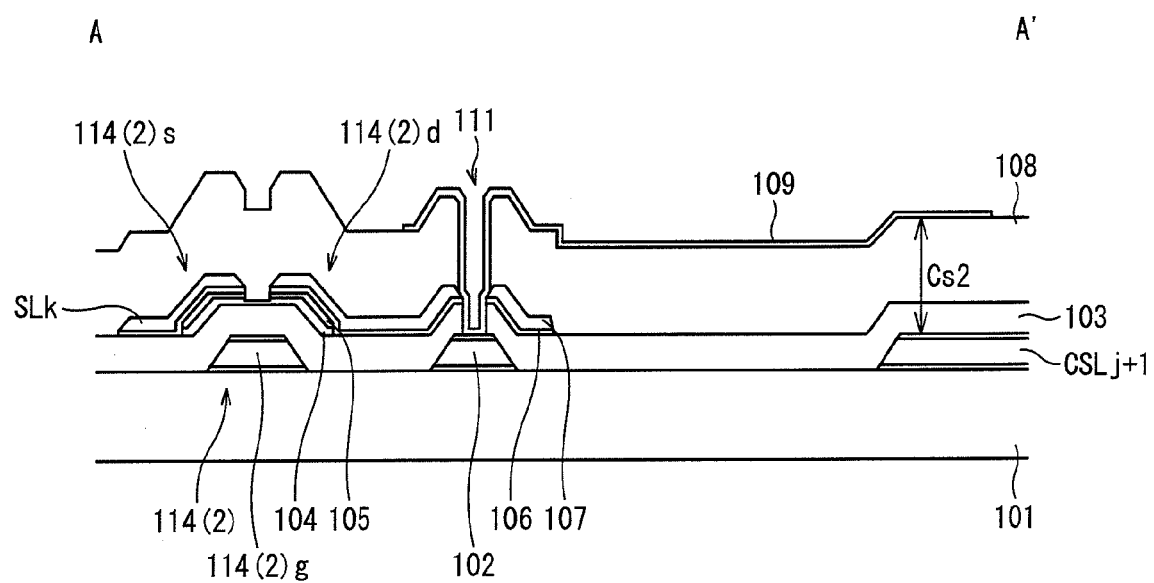
FIG. 14
Figure 15:
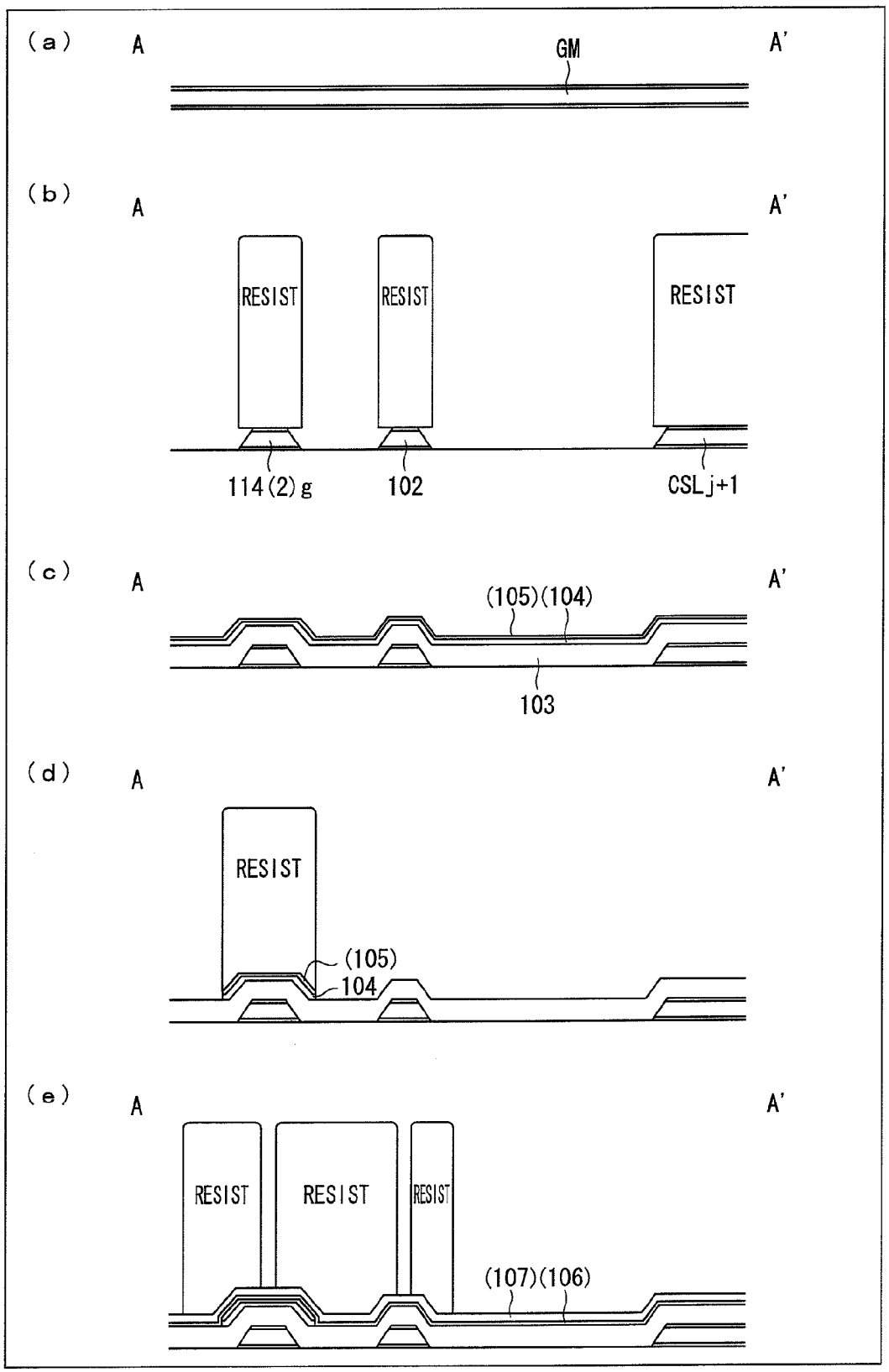
FIG. 15
Figure 16:
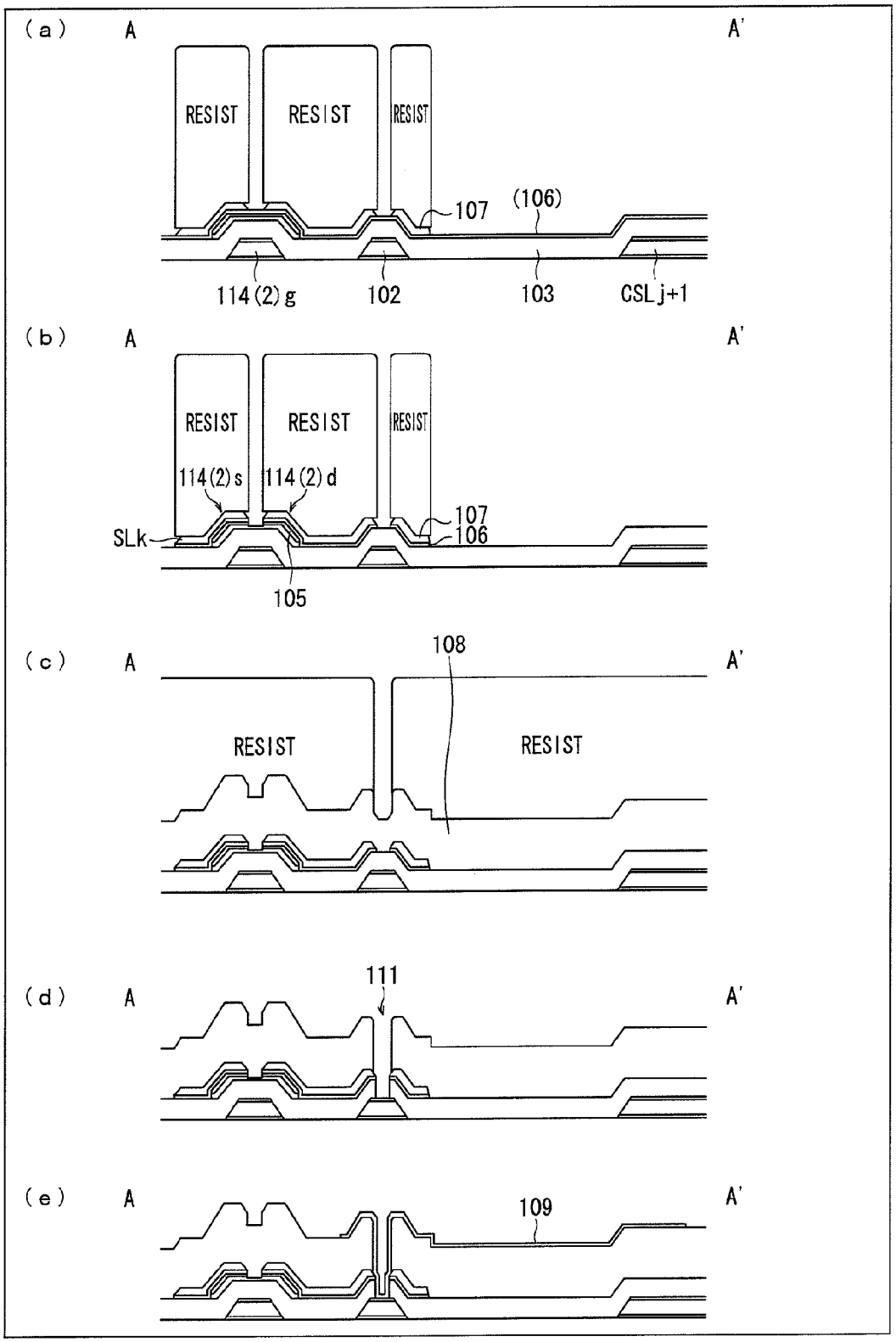
FIG. 16
Figure 17:
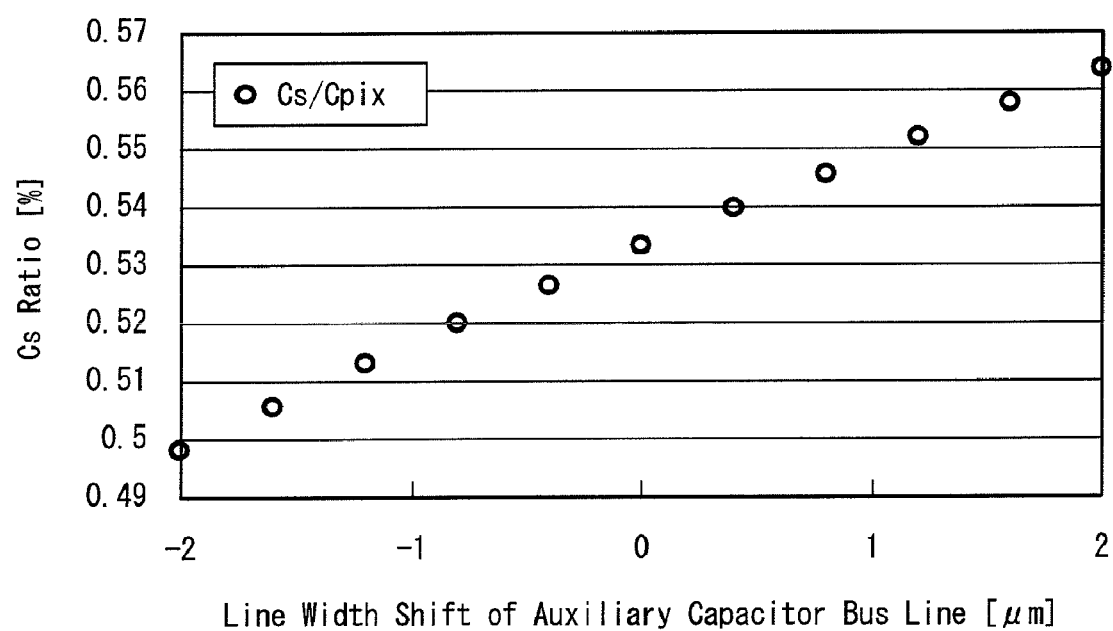
FIG. 17
Figure 18:
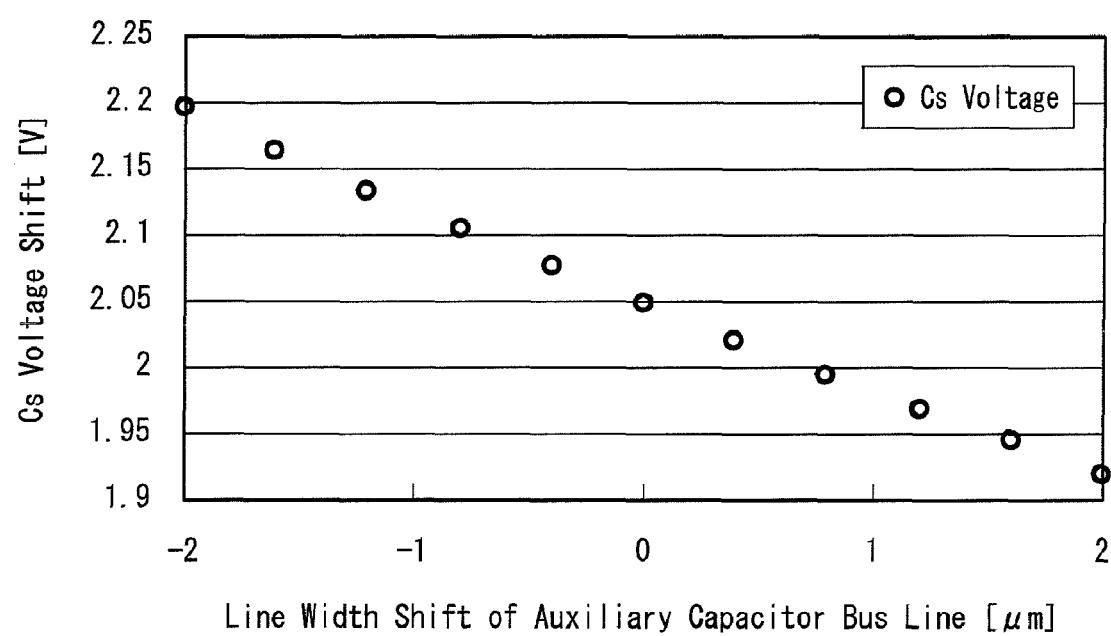
FIG. 18
Figure 19:
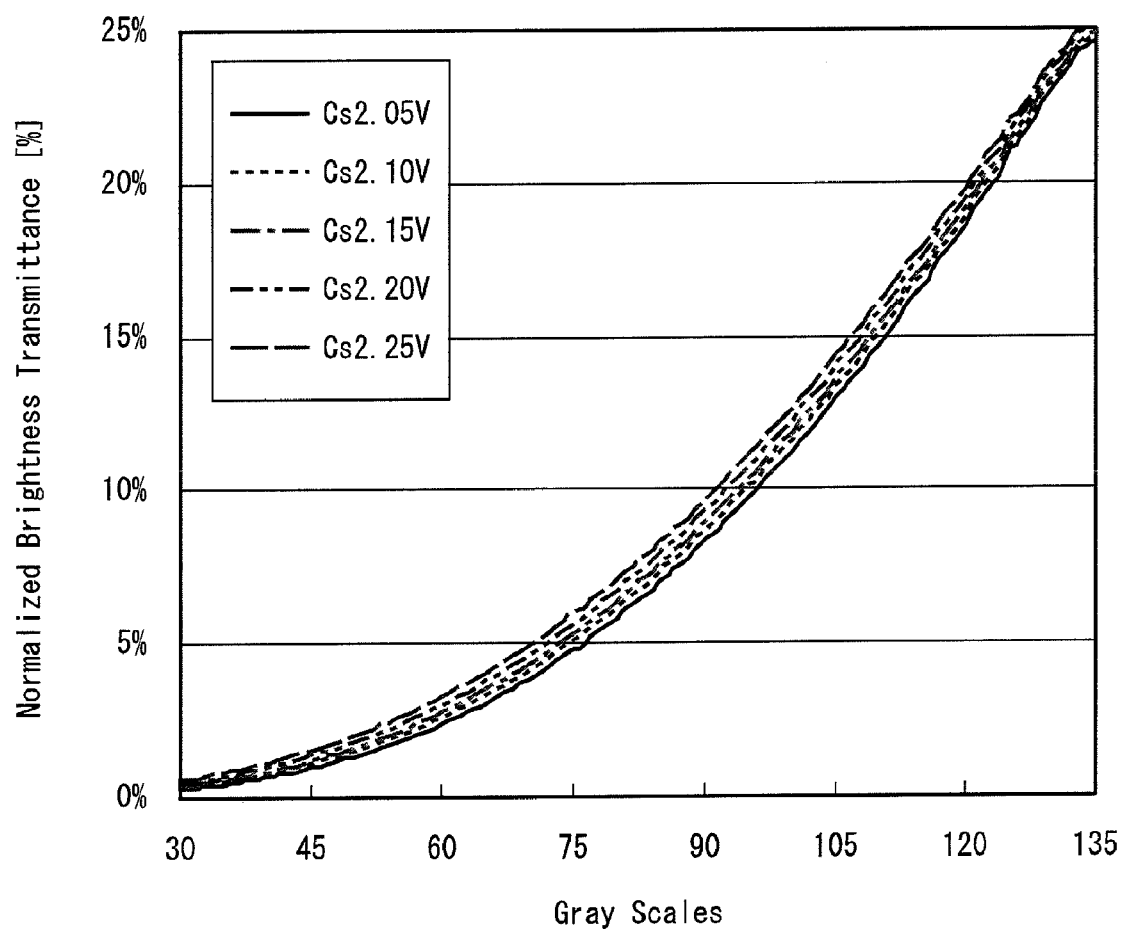
FIG. 19

The equivalent circuit illustrated above in FIG. 13 applies also to the picture element of this Embodiment.

The picture element PIXjk is structured such that the TFT 14(1) and the TFT 14(2) become conductive at the same time when a selective voltage is applied to the gate bus line GLj. At this point, a voltage of a data signal that is supplied to the source bus line SLk is written to the picture element electrode 79 of each of the sub picture elements P1 and P2. The auxiliary capacitor bus line CSLj and the auxiliary capacitor bus line CSLj+1 are driven by, for example, binary voltages in opposite phases. Accordingly, even if the same data signal is supplied from the source bus line SLk to the sub picture elements P1 and P2, each of the liquid crystal capacitors CL1 and CL2 applies a different voltage to a liquid crystal layer. As a result, it is possible to achieve different display brightness, thereby achieving excellent visual characteristics of the picture element PIXjk as a whole.

FIG. 1 shows a cross-sectional view taken along the line A-A' of FIG. 2. Patterned on a transparent substrate 71 are: the gate electrode 14(2)g of the TFT 14(2); the auxiliary capacitor bus line CSLj+1; and a gap adjusting layer 72, each of which is made of a gate metal layer that is a laminate film of Ti/Al/Ti. Further, although not illustrated, the gate bus line GLj is also patterned on the transparent substrate 71 by using the gate metal layer. Then, on these patterns, a first gate insulating film (first insulating film) 73a is formed so that the patterns are covered with the first gate insulating film 73a. Above the gate electrode 14(2)g, a semiconductor layer 74 made of an intrinsic semiconductor layer (i-layer) and a semiconductor layer 75 made of a silicon n+ layer (ohmic contact layer) are stacked in this order on the first gate insulating film 73a in positions each of which corresponds to a source region and a drain region. Further, formed on the semiconductor layers 74 and 75 so as to cover the semiconductor layers 74 and 75 are: the source bus line SLk, source electrode 14(2)s, the drain electrode 14(2)d, and the isolated electrode 91, each of which is made of a source metal formed by stacking a first source metal layer 76 made of Ti and a second source metal layer 77 made of Al in this order. The drain electrode 114(2)d is provided so that it reaches a position above the gap adjusting layer 72.

Furthermore, a passivation film 78 made of $SiN_X$ is formed on the substrate, on which the source electrode 14(2)s and the drain electrode 14(2)d are formed, so that the substrate is covered with the passivation film 78. Formed on the passivation film 78 is the picture element electrode 79 made of an ITO (transparent electrode). The picture element electrode 79 is connected to the drain electrode 14(2) through the contact hole 81 penetrating through the passivation film 78 and the second gate insulating film 73b. The contact hole 81 includes an etching aperture of the drain electrode 14(2) and a through hole formed on the first gate insulating film 73a, and reaches a top surface of the gap adjusting layer 72. As such, the picture element electrode 79 makes contact also with the top surface of the gap adjusting layer 72.

Further formed on the passivation film 78 is the connection electrode 92 made of the ITO (transparent electrode). The connection electrode 92 is connected to the isolated electrode 91 through the contact hole 82 formed penetrating through the passivation film 78 and the second gate insulating film 73a. The passivation film 78 and the second gate insulating film 73b constitutes a second insulating film. The contact hole 82 includes an etching aperture of the isolated electrode 91 and a through hole formed on the first gate insulating film 73a, and reaches a top surface of the auxiliary capacitor bus line CSLj+1. As such, the connection electrode 92 makes contact also with the top surface of the auxiliary capacitor bus line CSLj+1.

On the substrate on which the picture element electrode and the connection electrode 92 are patterned, an alignment film (not illustrated) is formed.

The isolated electrode 91 overlaps the picture element electrode 79 so as to form the auxiliary capacitor Cs2. Here, the auxiliary capacitor Cs2 is a capacitor $C_{GI2+PAS}$, whose dielectric material is a laminate film made of the second gate insulating film (GI2) 73b and an interlayer insulating film (PAS) 78.

The TFT substrate is configured as described above; however, a counter substrate may be configured in the same manner as the conventional counter substrate. A liquid crystal layer is provided between the TFT substrate and the counter substrate. An example of an applicable liquid crystal driving method is a VA (Vertical Alignment) method.

Next, a manufacturing process of the structure of FIG. 1 is described with reference to FIGS. 3 and 4. Here, the transparent substrate 71 is not illustrated in FIGS. 3 and 4.

Figure 3:
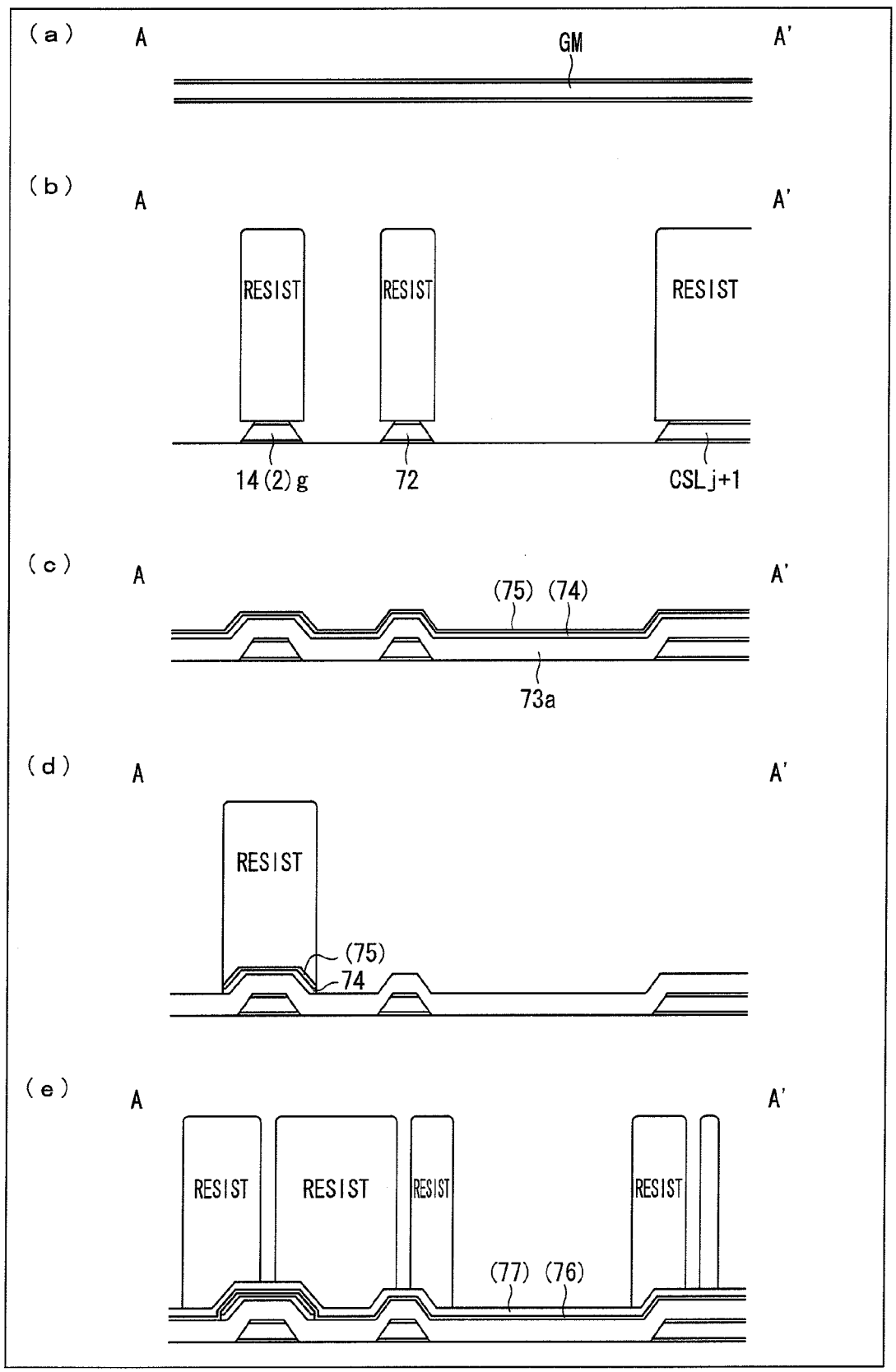
FIG. 3

First in step 1, as shown in (a) of FIG. 3, the gate metal layer (first metal layer) GM made of the laminate film of Ti/Al/Ti is formed on the transparent substrate 71 by sputtering. Next in step 2, as shown in (b) of FIG. 3, a photoresist is patterned so that it remains on a part of the gate metal layer GM, which part is desired to remain on the transparent substrate 71. Here, the photoresist is patterned by performing exposure, development, and post-bake in this order (the photoresist is patterned in this manner also in the after-described processing steps). Then, by using the photoresist as an etching mask, the gate metal layer GM is wet-etched with etchant containing a mixture solution of hydrofluoric acid and nitric acid, a mixture solution of hydrofluoric acid and hydrogen peroxide, or the like, thereby forming the gate electrode 14(2)g, the auxiliary capacitor bus line CSLj+1, and the gap adjusting layer 72. Such a wet etching method may be selected from methods described in Patent Literatures 3 to 7, by which methods a Ti alloy or a metal containing Ti is etched. Since such methods have a high etching rate, etching uniformity is preferably increased by, for example, stirring the etchant or spraying the etchant.

As described in Background Art, a side-etching amount due to the wet etching varies generally based on a principle of an isotropic etching. Therefore, a combination of the gate metal layer GM and the etchant for wet-etching the gate metal layer GM is not particularly limited, and may be selected from for example any combination known to be used in a liquid crystal process.

Next in step 3, as shown in (c) of FIG. 3, the gate insulating film 73a is formed. On the gate insulating film 73a, the intrinsic semiconductor layer, which will become the semiconductor layer 74, and the n+ silicon layer, which will become the semiconductor layer 75, are grown in succession. Then in step 4, as shown in (d) of FIG. 3, the photoresist is patterned. By using the photoresist as the etching mask, the silicon n+ layer and the intrinsic semiconductor layer are etched so as to form (i) the semiconductor layer 74 and (ii) the semiconductor layer 75 which is not yet separated into the source region and the drain region. Subsequently in step 5, as shown in (e) of FIG. 3, a Ti film, which will become the first source metal layer 76, and an Al film, which will become the second source metal layer 77, are formed all over by sputtering, and thereafter, the photoresists are patterned for forming the source bus line SLk and for a gap-etching of the TFT 14(2), i.e., for separating the source region and the drain region.

In performing this patterning, it is necessary to also form an etching window in a region on which the contact holes 81 and 82 are to be formed. In this regard, since there is the gap adjusting layer 72 provided beneath the region on which the contact hole 81 is to be formed and there is the auxiliary capacitor bus line CSLj+1 provided beneath the region on which the contact hole 82 is to be formed, it is possible to pattern the etching window in the substantially same plane as the other patterns. Further, the gap adjusting layer 72 makes it possible to stop the etching at the Ti film formed on a top surface of the gap adjusting layer 72 by utilizing a difference in etching rate, in a case where the contact hole 81 is made deeper to the first gate insulating film 73. The etching stop can be applied to stop the etching performed for the contact hole 82 above the auxiliary capacitor bus line CSLj+1.

Figure 4:
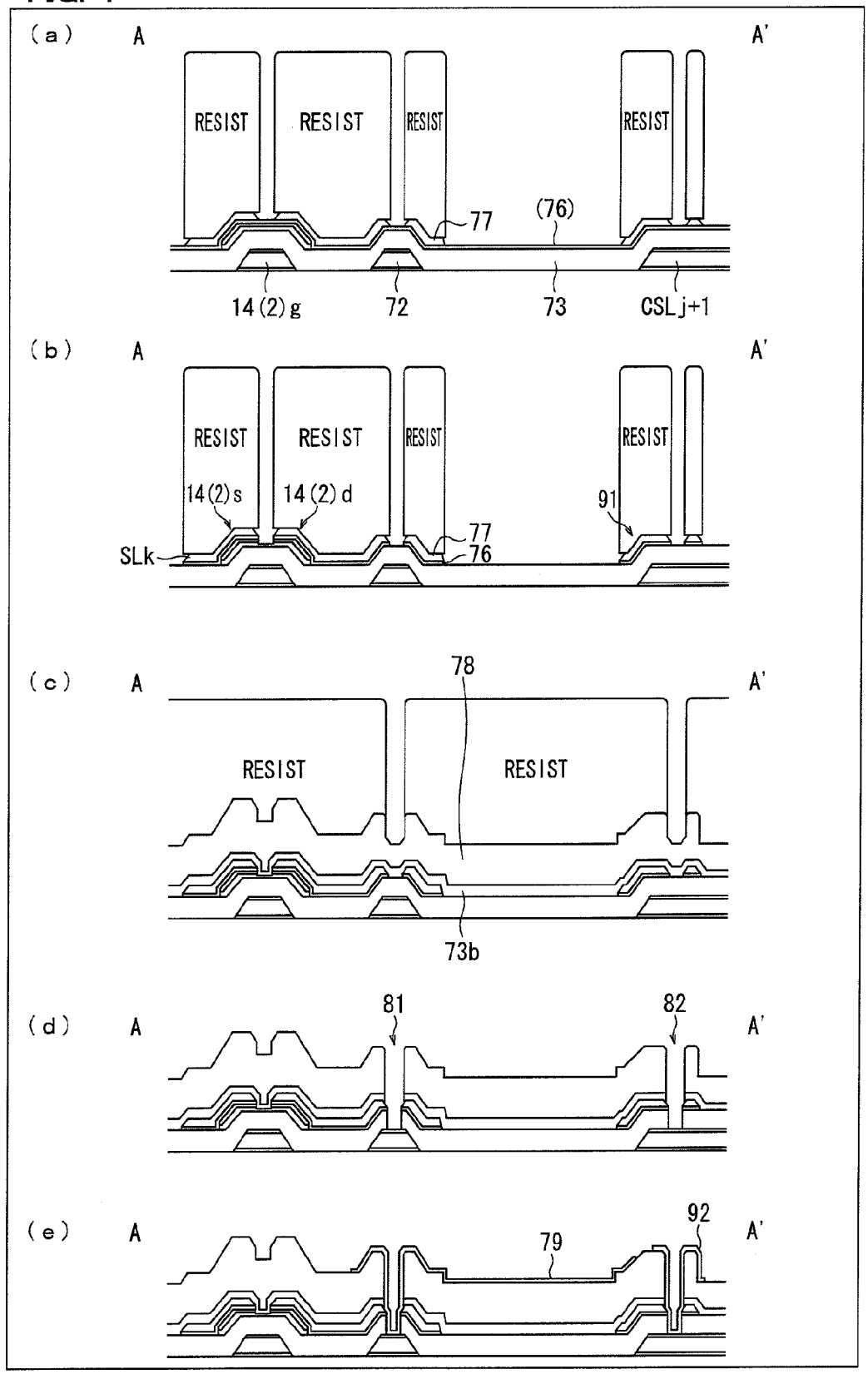
FIG. 4

Then in step 6, as shown in (a) of FIG. 4, by using the photoresists as the etching masks, the Al film is etched selectively against the Ti film with phosphoric acid or the like. Since such methods have a high etching rate, the etching uniformity is preferably increased by, for example, stirring the etchant or spraying the etchant. Next in step 7, as shown in (b) of FIG. 4, by using the above photoresists as the etching masks, the Ti film is dry-etched by the reactive ion etching using the chlorine gas. Here, in the TFT 14(2) region, the n+ silicon layer is also etched at the same time. As a result, the first source metal layer 76 and the second source metal layer 77 are formed, thereby obtaining the source bus line SLk, the source electrode 14(2)s, the drain electrode 14(2)d, and the isolated electrode 91.

In the example described above, the source metal layer as a whole was the second metal layer made of two types of layers (Al and Ti), wherein an upper layer was wet-etched whereas a lower layer was dry-etched. However, the second metal layer may be etched only by the dry etching method in either cases where the second metal layer is a single layer film or where the second metal layer is a multilayer film. Further, in the case where the second metal layer is the multilayer film as described above in the example, such a second metal layer may be etched by patterning at least an undermost layer by the dry etching method, provided that a pattern size of the undermost layer determines the auxiliary capacitor Cs when at least the undermost layer is patterned by the dry etching method.

As typically seen in parallel plate type RIE, the dry etching makes it possible to minimize the side-etching amount itself by an anisotropic etching in which the etching generally proceeds in a direction perpendicular to a surface of the substrate. This makes it possible to minimize variation in the side-etching amount. For example, in the present embodiment, the side-etching amount is suppressed down to approximately 1 μm, which is very small. Therefore, a combination of the second metal layer and an etching gas for dry etching the second metal layer is not particularly limited, and may be selected from for example any combination known to be used in the liquid crystal process.

Next in step 8, as shown in (c) of FIG. 4, the second gate insulating film 73b and the passivation film 78 are formed all over by CVD, and the photoresists are patterned so as to form the contact holes 81 and 82. Further in step 9, as shown in (d) of FIG. 4, the passivation film 78 and the second gate insulation film 73b are dry-etched by the reactive ion etching using the chlorine gas. In this manner, the contact holes 81 and 82 are formed. Residues generated and left in the contact holes 81 and 82 can be removed by for example a method described in Patent Literature 8, thereby achieving a sufficiently low conduction resistance in the contact holes. The number of each of the contact holes 81 and 82 may be plural. In a case where a plurality of contact holes for each purpose are provided, conduction failure attributed to a defect in an opening of the contact holes becomes less likely to occur. Accordingly, for example the region in which the connection electrode 92 is to be formed may be determined as needed depending on the number of the contact holes 82 to be formed.

Then in step 10, as shown in (e) of FIG. 4, the picture element electrode 79 is formed on the passivation film 78 and on an inner surface of the contact hole 81, as well as the connection electrode 92 is formed on the passivation film 78 and on an inner surface of the contact hole 82.

As described above, in the present embodiment, the isolated electrode 91 overlapping with the picture element electrode 79 so as to form the auxiliary capacitor Cs is positioned on a lower side of the picture element electrode 79 and on an upper side of the auxiliary capacitor bus line CSL, so that the isolated electrode 91 is in contact with the auxiliary capacitor bus line CSL. As a result, even if the auxiliary capacitor bus line CSL is patterned by wet etching, it is possible to form the auxiliary capacitor electrode by any process; that is, it becomes possible to pattern the auxiliary capacitor electrode by dry etching. Patterning the auxiliary capacitor electrode by dry etching makes it possible to minimize variation in pattern size of the auxiliary capacitor electrode, and therefore, possible to minimize variation in the auxiliary capacitor Cs within a surface of the substrate.

Consequently, even if the auxiliary bus line is patterned by wet etching, i.e., even if the line width of the auxiliary capacitor bus line varies among the panels, it is possible to achieve a display panel in which the variation in the auxiliary capacitor among the panels can be minimized, since an auxiliary capacitor electrode in a stable shape is formed on an upper side of the auxiliary capacitor bus line.

Further, as shown in the above example, if a picture element includes a plurality of sub picture elements which share one scanning signal line and one data signal line, each of which sub picture elements includes an auxiliary capacitor, it is possible to let each sub picture element have different brightness by supplying the same data signal to the sub picture elements but applying different voltage to the auxiliary capacitor bus line of each of the sub picture elements. Apart from the above example, it is also easy to adopt a structure in which one picture element includes three or more sub picture elements. Accordingly, in a configuration of a high quality display that is capable of improving a visual characteristic of a whole picture element, it is possible to deal with irregularity of a γ characteristic among panels due to the variation in the auxiliary capacitor. As a result, it is possible to achieve a higher quality display.

Furthermore, in the above example, the isolated electrode 91 is formed concurrently with the gap-etching of the TFT. Conventionally, in patterning the picture element electrode made of the ITO, a photo-alignment for aligning the pattern of the picture element electrode has been performed with respect to the auxiliary capacitor bus line and the source bus line, which are different from each other and have an interlayer gap therebetween. Therefore, as shown in FIG. 20, the exposure was likely to be inaccurate (e.g., each layer was inaccurately aligned) when the exposure was performed by a lens-scanning method and even when the exposure was performed by a stepper method by which a divided projection exposure (step-and-repeat exposure) is performed.

Figure 20:
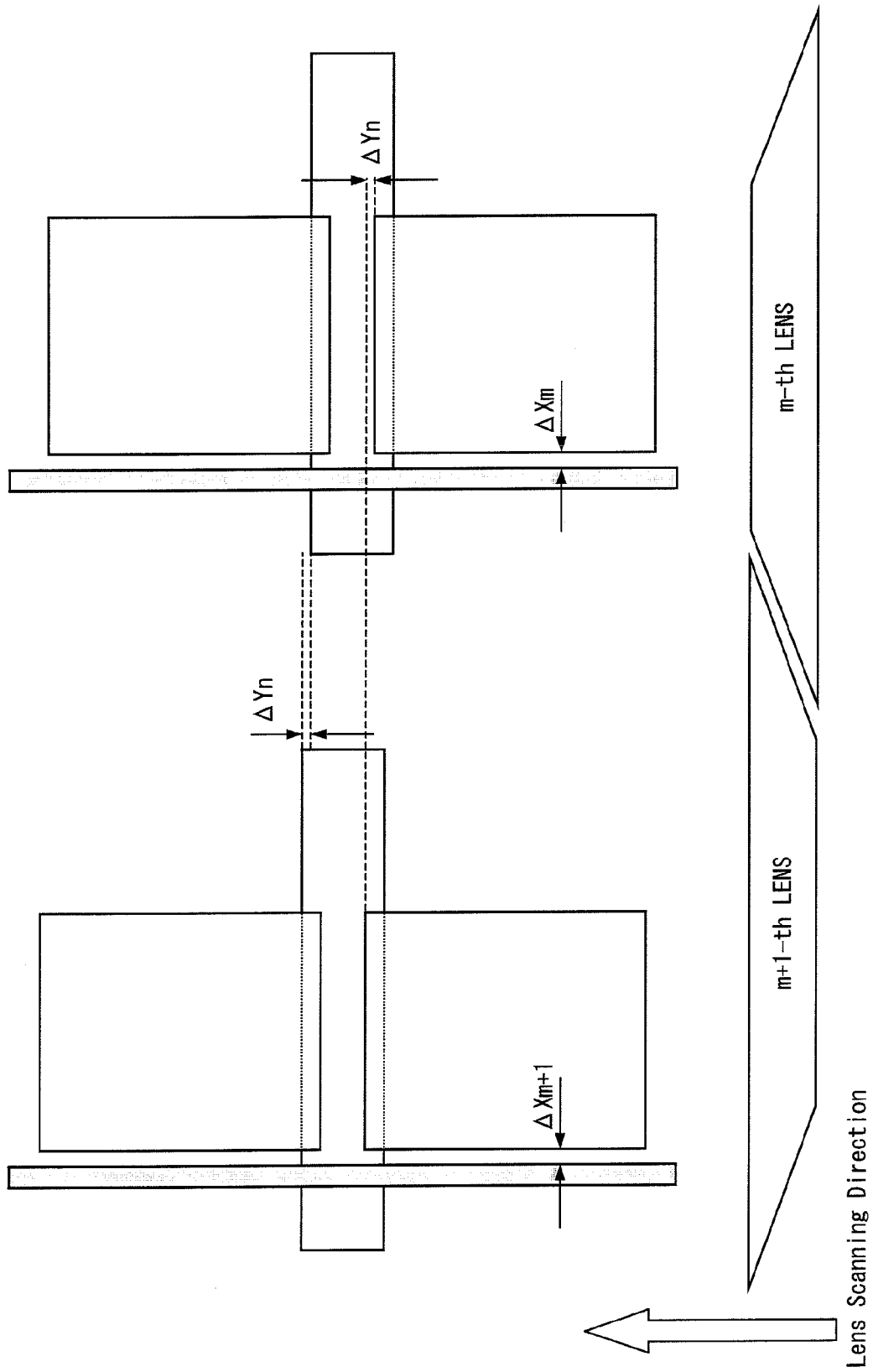
FIG. 20

FIG. 20 illustrates a case where the pattern of the picture electrode formed in m-th lens scan and the pattern of the picture electrode formed in m+1-th lens scan were misaligned with each other by ΔYn. This was because the pattern of the picture electrode was aligned, along a direction parallel to the source bus line, with respect to the patterns of the gate bus line and the auxiliary bus line under a condition where (i) the patterns of the gate bus line and the auxiliary capacitor bus line before being subjected to the m-th lens scan and (ii) the patterns of the gate bus line and the auxiliary capacitor bus line before being subjected to the m+1-th lens scan were misaligned with each other by ΔYn. FIG. 20 also illustrates a case where an interval between the pattern of the source bus line and the pattern of the picture element electrode was ΔXm when they were aligned and formed in the m-th lens scan, whereas the interval between the pattern of the source bus line and the pattern of the picture element electrode was ΔXm+1 when they were aligned and formed in the m+1-th lens scan.

Figure 21:
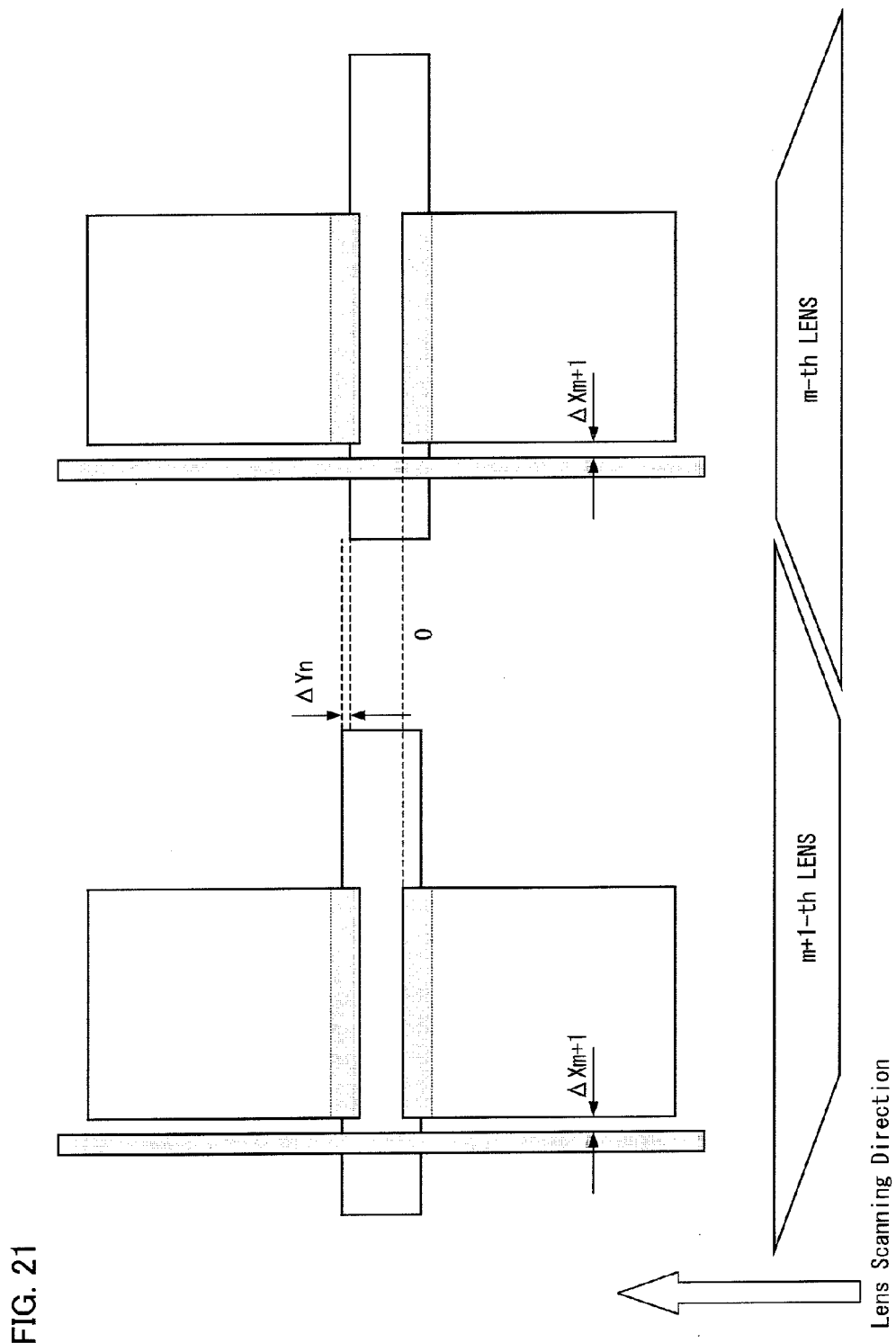
FIG. 21

In contrast, in the present embodiment, the pattern of the picture element electrode 79 is aligned with respect to the source bus line and the isolated electrode 91, which are layers made of the same source metal. In this configuration, since a single-layer alignment can be performed and the variation in pattern size of each isolated electrode 91 is small, a margin of accuracy of the photo-alignment improves to at least the order of 1 μm. This leads to an improvement in accuracy of the exposure, thereby improving mass productivity. FIG. 21 illustrates a case where the pattern of the picture element electrode formed in the m-th lens scan and the pattern of the picture electrode formed in the m+1-th lens scan are accurately aligned, and the interval between the pattern of the source bus line and the pattern of the picture element electrode formed in the m-th lens scan was the same with the interval between the pattern of the source bus line and the pattern of the picture element electrode formed in the m+1-th lens scan (ΔXm+1), even if the patterns of the gate bus line and the auxiliary capacitor bus line before being subjected to the m-th lens scan and the patterns of the gate bus line and the auxiliary capacitor bus line before being subjected to the m+1-th lens scan are misaligned with each other by ΔYn.

Embodiment 2

Figure 5:
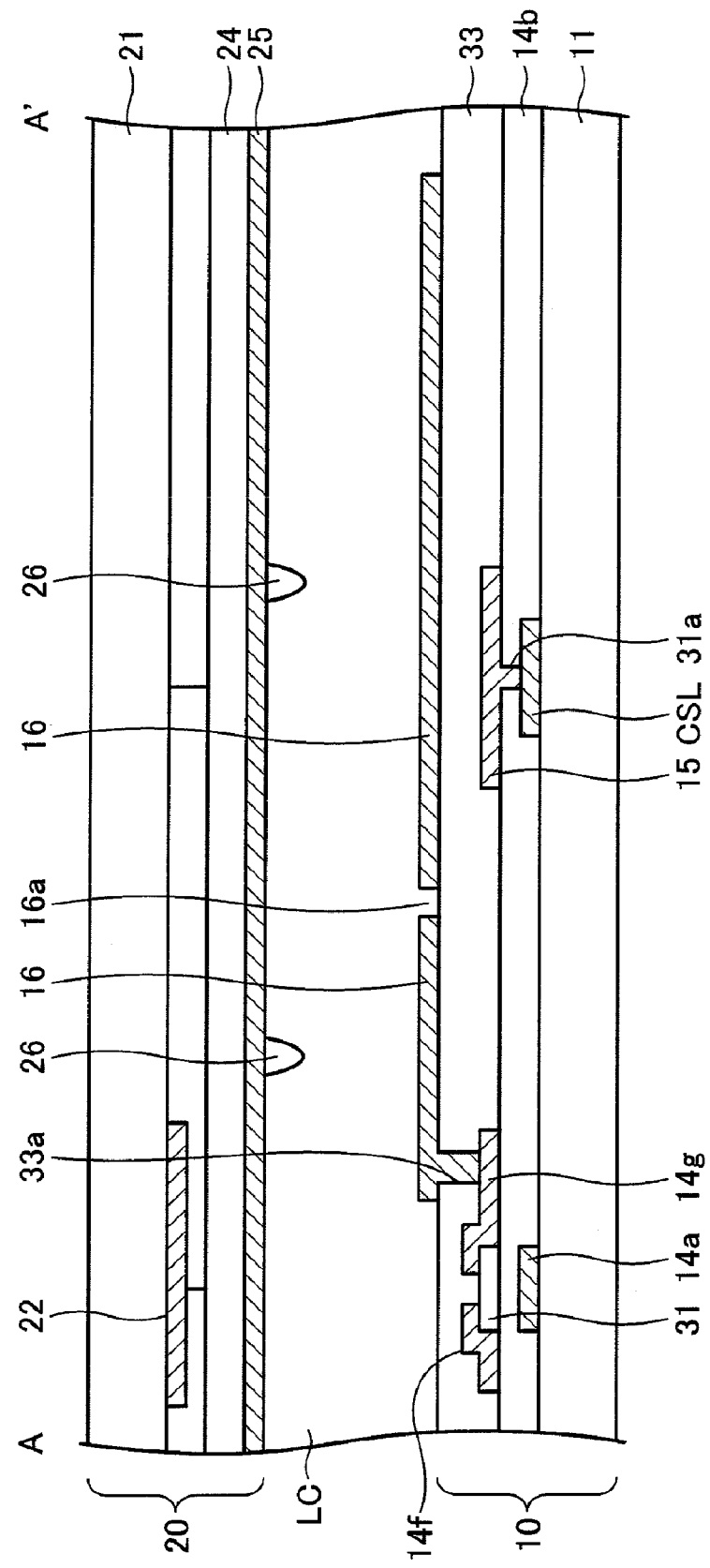
FIG. 5
Figure 6:
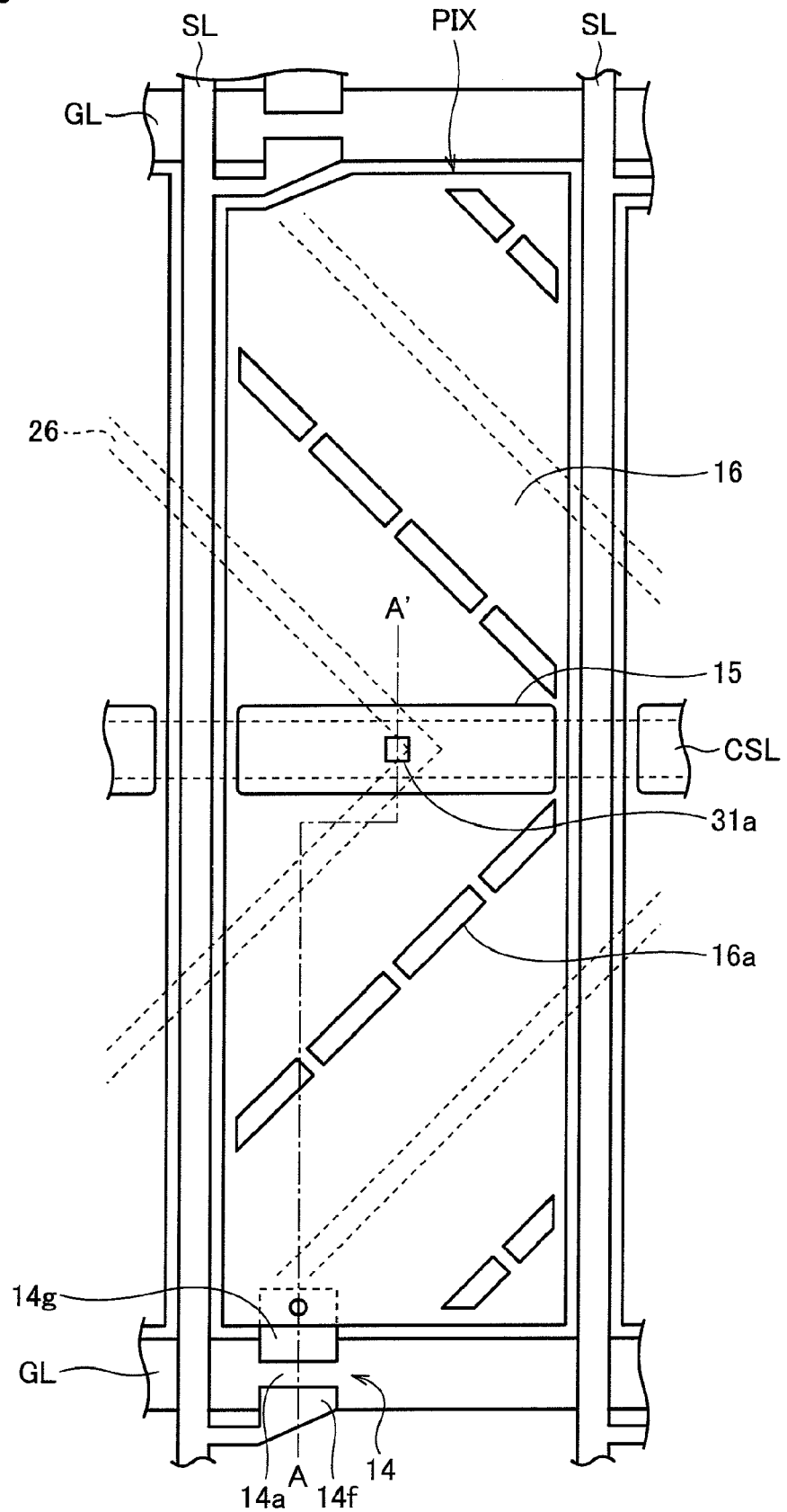
FIG. 6

FIG. 6 shows a plan view of the picture element electrode PIX of the present embodiment. FIG. 5 is a cross-sectional view taken along the line A-A' of FIG. 6.

The picture element PIX of the present embodiment is configured so that the picture element PIX is driven by a VA mode, especially by an MVA (Multi-domain Vertical Alignment) mode. In FIG. 6, a region enclosed with two gate bus lines GL which are adjacent with each other and two source bus lines SL which are adjacent with each other is equivalent to a region of one picture element PIX. Since each picture element does not include sub picture elements in the present embodiment, the picture element PIX, the gate bus line GL, and the source bus line SL are not provided with reference numerals indicative of line numbers and column numbers, for a simpler description. A TFT 14 is provided in the vicinity of an intersection of the gate bus line GL and the source bus line SL. A pattern of the gate bus line GL is used as it is as a gate electrode 14a of the TFT 14. Further, the TFT 14 includes a source electrode 14f which is connected to the source bus line SL.

A laminated structure of the TFT 14 is described as follows. As shown in FIG. 5, the TFT 14 is structured such that a gate electrode 14a; a gate insulating film 14b; a layer 31 made of a semiconductor layer and a contact layer; the source electrode 14f and a drain electrode 14g; and a passivation film 33 are sequentially stacked on a glass substrate 11, which is a transparent insulating substrate. The drain electrode 14g is connected to the picture element electrode 16 provided on the passivation film 33, through a contact hole 33a formed on the passivation film 33.

As shown in FIG. 6, in the picture element electrode 16, a plurality of slits 16a are provided (aligned) in a row obliquely with respect to a direction that the gate bus line GL extends and to a direction that the source bus line SL extends. The patterns of the slits 16a are disposed in such a manner that one row of the patterns of the slits 16a and another row of the patterns of the slits 16a are symmetrically-placed with respect to a centerline that is parallel to the gate bus line GL of the picture element PIX. The row of the slits 16a is such that a plurality of slits 16a are aligned in parallel to each other at predetermined intervals.

Further, as shown in FIG. 6, an auxiliary capacitor bus line CSL is provided along the centerline of the picture element PIX. As shown in FIG. 5, the auxiliary capacitor bus line CSL is provided on the glass substrate 11. On an upper side of the auxiliary capacitor bus line CSL in a thickness direction, an isolated electrode (auxiliary capacitor electrode) 15 is provided. The isolated electrode 15 overlaps the auxiliary capacitor bus line CSL via the gate insulating film 14b, and has a larger pattern width along a direction that the source bus line SL extends than that of the auxiliary capacitor bus line CSL. Further, the isolated electrode 15 is connected to the auxiliary capacitor bus line CSL through a contact hole 31a that is formed on the gate insulating film 14b. In this structure, the isolated electrode 15 overlaps the picture element electrode 16 positioned on the upper side of the isolated electrode 15 in the thickness direction via the passivation film 33, so that a pair of the isolated electrode 15 and the picture element electrode 16 forms an auxiliary capacitor Cs.

So far described was a structure of the TFT substrate 10.

As shown in FIG. 5, a counter substrate 20 has a conventional structure in which a black matrix 22, a color filter 24, a counter electrode 25, projections 26, and the like are sequentially stacked on a glass substrate 21. As shown in FIG. 6, the projections 26 are provided between the rows of the slits 16a, and are extending parallel to the rows.

Provided between the TFT substrate 10 and the counter substrate 20 is a liquid crystal layer LC.

Figure 7:
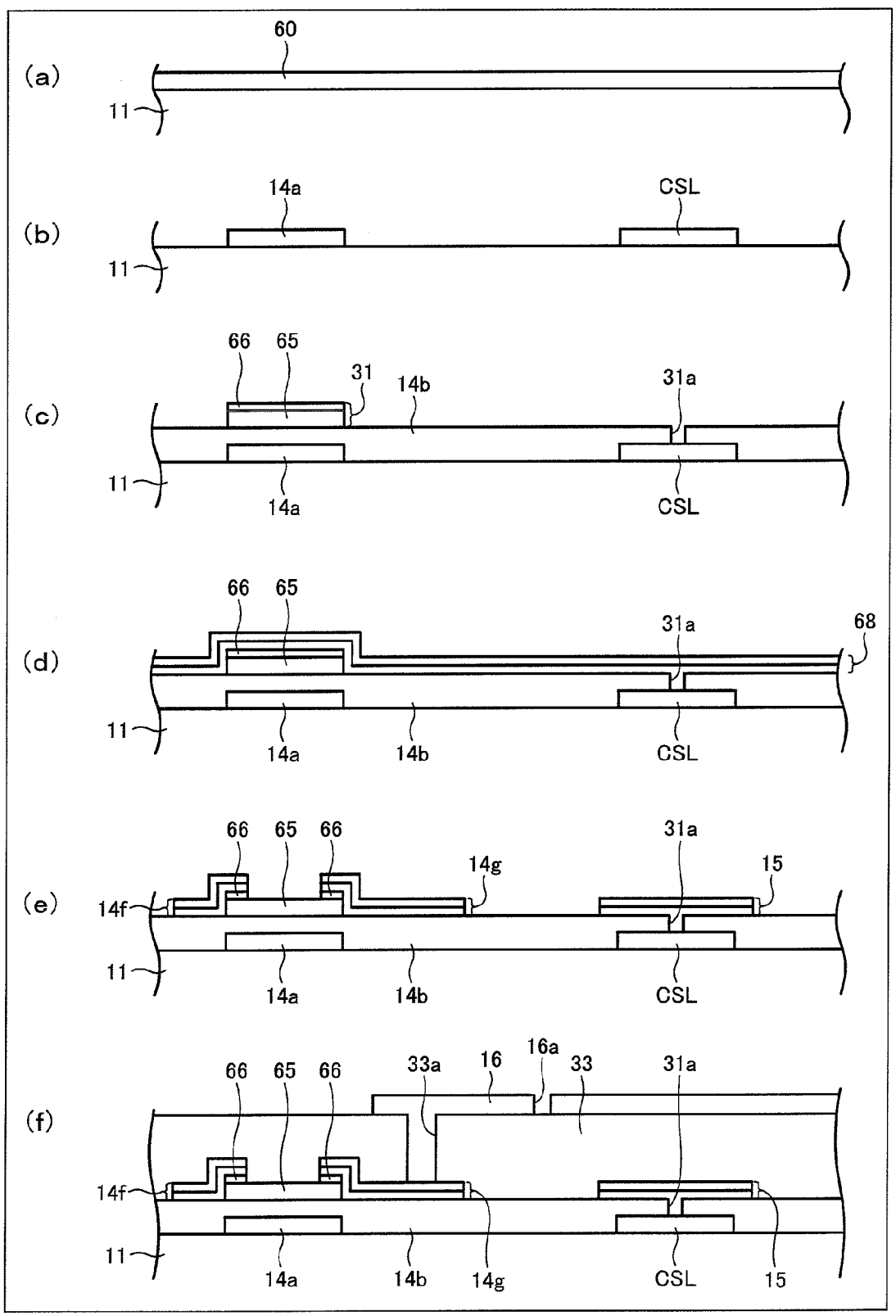
FIG. 7

Next, a manufacturing process of the picture electrode PIX having the above-described structure is described, from the TFT substrate 10 side, with reference to FIG. 7.

In step 1, as shown in (a) of FIG. 7, the gate bus line GL, the gate electrode 14a, and a gate metal layer (a first metal layer) 60 that will be patterned into the auxiliary capacitor bus line CSL are formed on the glass substrate 11. The gate metal layer 60 is for example an Al/Ti laminate film or a Ti/Al/Ti laminate film formed by sputtering. In step 2, as shown in (b) of FIG. 7, patterns of the gate bus line GL (including the gate electrode 14a) and the auxiliary capacitor bus line CLS are formed by a photo photolithographic method, with use of a wet etching method as described in Patent Literatures 3 to 7. Examples of an etchant used in the wet etching are those containing a mixture of hydrofluoric acid and nitric acid and a mixture of hydrofluoric acid and hydrogen peroxide. As described in Background Art, a side-etching amount due to the wet etching changes generally based on a principle of an isotropic etching. Therefore, a combination of the gate metal layer 60 and the etchant for wet-etching the gate metal layer 60 is not particularly limited, and may be selected from any combination known to be used in a liquid crystal process.

In step 3, as shown in (c) of FIG. 7, the gate insulating film (the first insulating film) 14b is formed, for example by $SiN_x$ or $SiO_2$, on a surface of the patterns of the gate bus line GL (including the gate electrode 14a) and the auxiliary capacitor bus line CSL. Then, the layer 31 that is formed on the gate insulating film 14b provided on an upper side of the gate electrode 14a. The layer 31 is formed by sequentially stacking the semiconductor layer 65 and the contact layer 66 and then appropriately patterned. The semiconductor layer 65 is formed for example by amorphous silicon, and the contact layer is formed for example by an $n^+$ silicon layer. Further, the contact hole 31a is formed on the gate insulating film 14b formed on the auxiliary capacitor bus line CSL.

In step 4, as shown in (d) of FIG. 7, a source metal layer (a second metal layer) 68, which will be patterned into the source bus line SL, the source electrode 14f, the drain electrode 14g, and the isolated electrode 15, is formed on surfaces of the patterns of the layer 31 and the contact hole 31a. The source metal layer 68 is for example the Al/Ti laminate film formed by sputtering. In step 5, as shown in (e) of FIG. 7, the patterns of the source bus line SL, the source electrode 14f, the drain electrode 14g, and the isolated electrode 15 are formed by the photolithographic method, with use of a dry etching method such as a reactive ion etching using chlorine gas. Note that in a case of the Al/Ti laminate film, an Al layer (upper layer) may first be wet-etched with phosphoric acid or the like and thereafter a Ti layer (lower layer) may be dry-etched with the chlorine gas or the like. In the case where the second metal layer is the multilayer film as described above, such a second metal layer may be etched by patterning at least an undermost layer by the dry etching method, provided that a pattern size of the undermost layer determines the auxiliary capacitor Cs when at least the undermost layer is patterned by the dry etching method.

As typically seen in parallel plate type RIE, the dry etching makes it possible to minimize the side-etching amount itself by an anisotropic etching. This makes it possible to minimize variation in the side-etching amount. Therefore, a combination of the source metal layer 68 and an etching gas for dry-etching the source metal layer 68 is not particularly limited, and may be selected from any combination known to be used in the liquid crystal process.

Further, after the source bus line SL, the source electrode 14f, the drain electrode 14g, and the isolated electrode 15 are patterned, uncovered part of the contact layer 66 is wet-etched by using the source electrode 14f and the drain electrode 14g as etching masks.

In step 6, as shown in (f) of FIG. 7, a passivation film (second insulating film) 33 is formed on the laminated structure formed in step 5. Examples of materials usable as the passivation film 33 are $SiN_x$, polyimide, acrylic resin, and the like. Next, the contact hole 33a is formed on the passivation film 33 formed on the drain electrode 14g. Then, the picture element 16 is formed on the passivation film 33 and on an inner surface of the contact hole 33a. The picture element electrode 16 used is for example an ITO (transparent electrode). Thereafter, the patterns of the slits 16a are formed on the picture element electrode 16.

Through the above-described processes, the TFT substrate 10 is obtained.

As described above, in the present embodiment, the isolated electrode 15 serving as the auxiliary capacitor electrode which overlaps the picture element electrode 16 so as to form the auxiliary capacitor Cs is positioned on a lower side of the picture element electrode 16 and on an upper side of the auxiliary capacitor bus line CSL, so that the isolated electrode 15 is in contact with the auxiliary capacitor bus line CSL. As a result, even if the auxiliary capacitor bus line CSL is patterned by wet etching, it is possible to form the auxiliary capacitor electrode by any process; that is, it becomes possible to pattern the auxiliary capacitor electrode by dry etching. Patterning the auxiliary capacitor electrode by dry etching makes it possible to minimize variation in pattern size of the auxiliary capacitor electrode, and therefore, possible to minimize variation in the auxiliary capacitor Cs among panels.

Consequently, even if the auxiliary bus line is patterned by wet etching, it is possible to achieve a display panel in which the variation in the auxiliary capacitor among the panels can be minimized.

Embodiment 3

Figure 8:
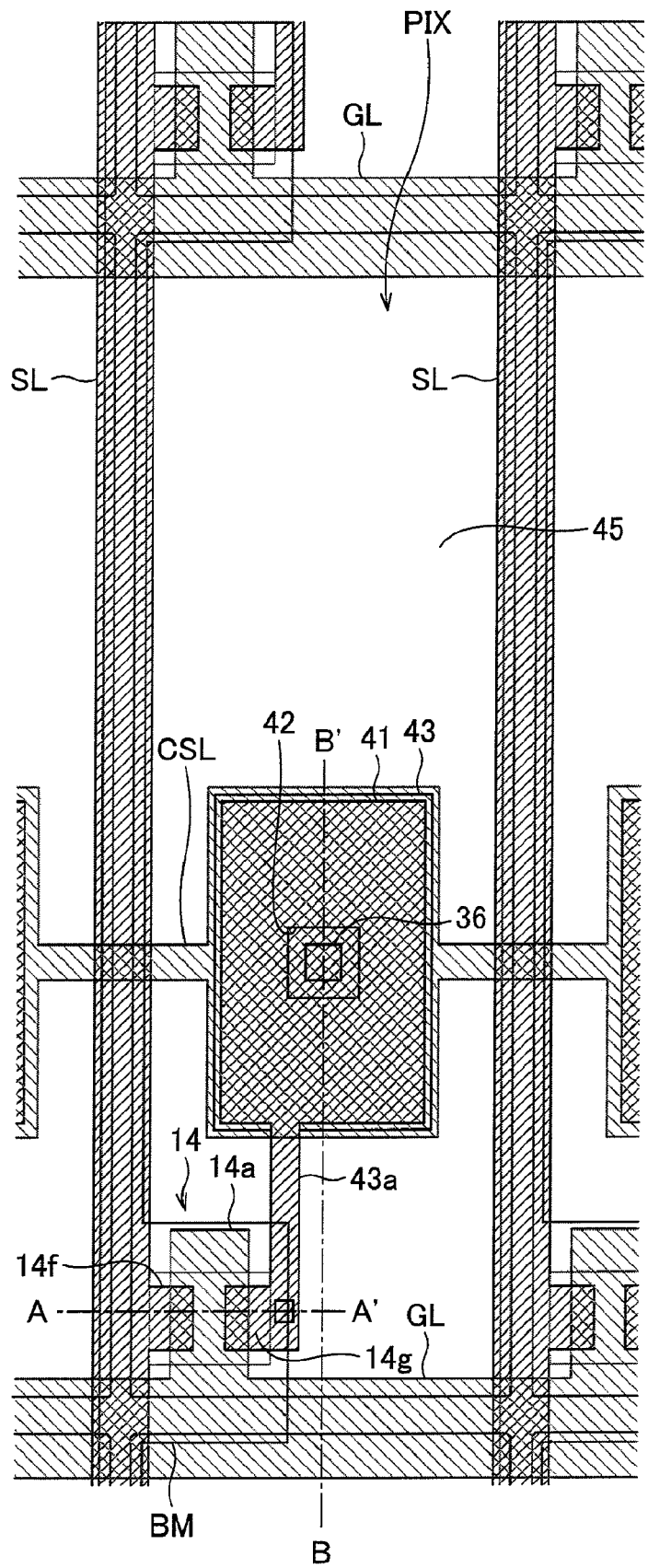
FIG. 8
Figure 9:
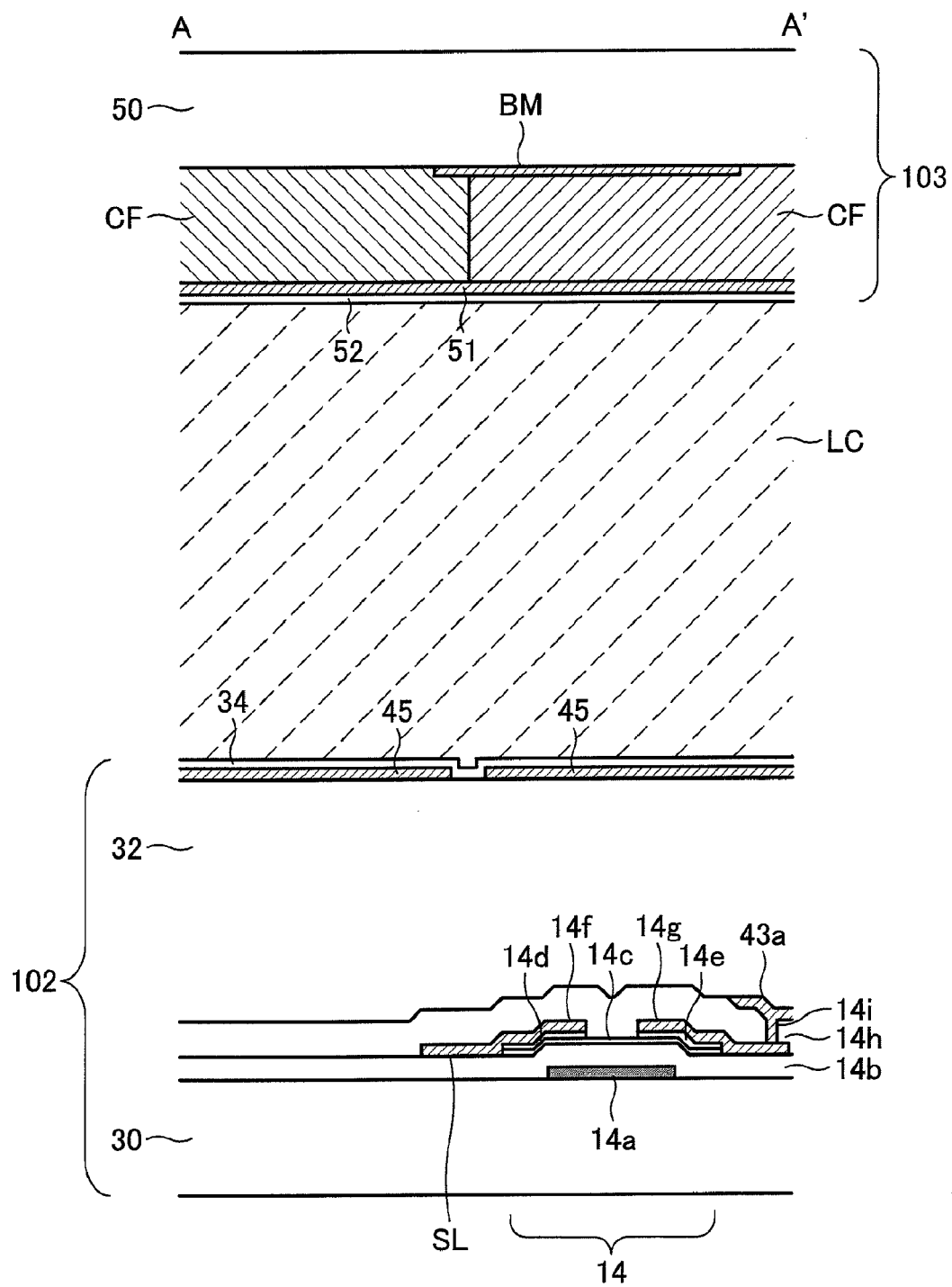
FIG. 9
Figure 10:
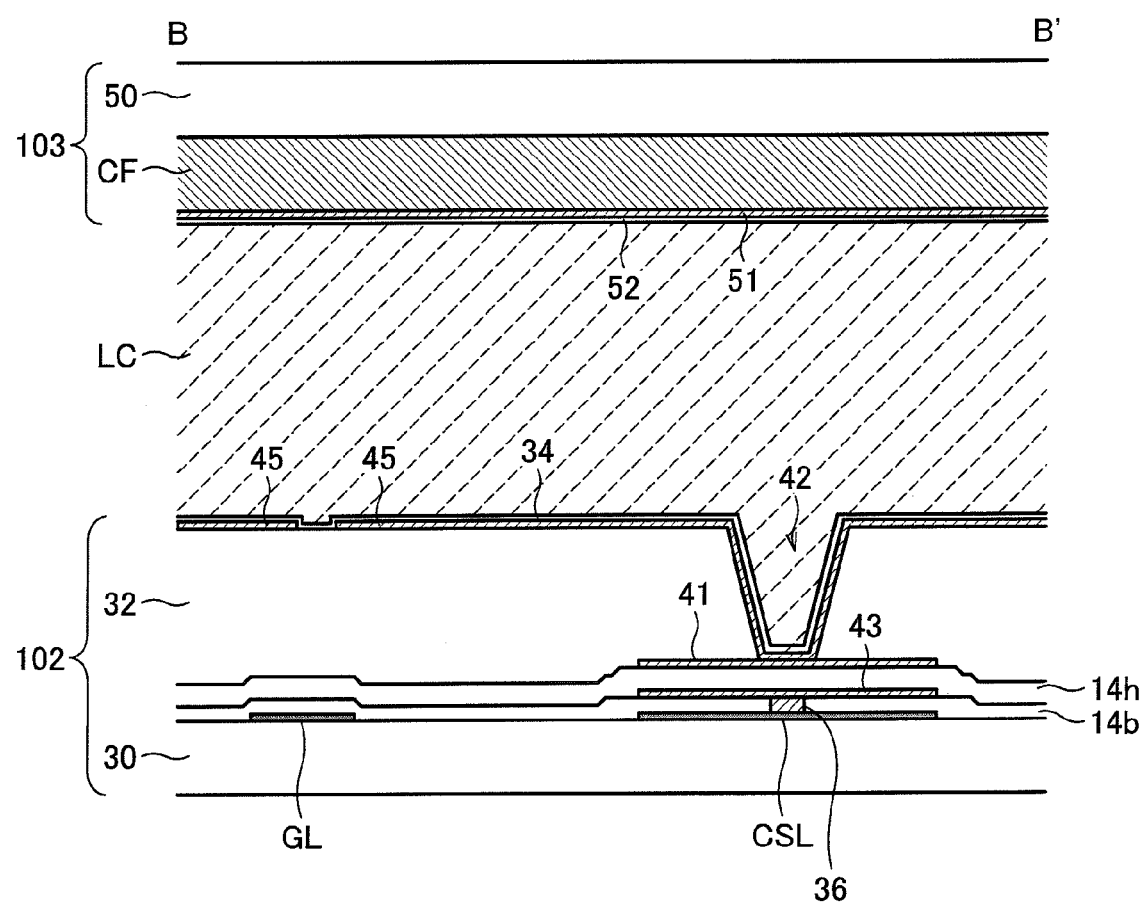
FIG. 10

FIG. 8 is a plan view of the picture element electrode PIX of the present embodiment. FIG. 9 is a cross-sectional view taken along the line A-A' of FIG. 8. FIG. 10 is a cross-sectional view taken along the line B-B' of FIG. 8.

The picture element PIX of the present embodiment is configured so that the picture element PIX is driven by a TN (Twisted Nematic) mode. In FIG. 8, a region enclosed with two gate bus lines GL which are adjacent with each other and two source bus lines SL which are adjacent with each other is equivalent to a region of one picture element PIX. Since each picture element does not include sub picture elements in the present embodiment, the picture element PIX, the gate bus line GL, and the source bus line SL are not provided with reference numerals indicative of line numbers and column numbers for a simpler description. A TFT 14 is provided in the vicinity of an intersection of the gate bus line GL and the source bus line SL. A pattern extended from the gate bus line GL is used as a gate electrode 14a of the TFT 14. Further, the TFT 14 includes a source electrode 14f which is connected to the source bus line SL.

A laminated structure of the TFT 14 is described as follows. As shown in FIG. 9, the TFT 14 is structured such that a gate electrode 14a; a gate insulating film 14b; a semiconductor layer 14c; a contact layer 14d; a source electrode 14f and a drain electrode 14g; and a passivation film 14h are sequentially stacked on a glass substrate 30, which is a transparent insulating substrate. The drain electrode 14g is connected to the picture element electrode 43a provided on the passivation film 14h, through a contact hole 14i formed on the passivation film 14h. The TFT 14 is produced in the same manner as in Embodiment 2 with the same materials as those used in Embodiment 2.

As shown in FIG. 8, in the picture element electrode PIX, an auxiliary capacitor bus line CSL is provided in parallel with a direction that the gate bus line GL extends. The auxiliary capacitor bus line CSL includes a two-dimensionally extended section having a rectangular-shape or the like shape.

As shown in FIG. 10, a isolated electrode (an auxiliary capacitor electrode) 41 is provided on the gate insulating film 14b provided on an upper side of the extended section. The isolated electrode 41 is connected to the extended section of the auxiliary capacitor bus line CSL through a contact hole 36 formed on the gate insulating film 14b. The extended section has almost the same size as the conventional electrode for forming the auxiliary capacitance so that the isolated electrode 43 is preferably formed on a flattened gate insulating film 14b; however, the size may be the same as a pattern width of the other part of the auxiliary capacitor bus line CSL. Further, on the passivation film 14h provided on an upper side of the isolated electrode 43, an auxiliary capacitor counter electrode 41 serving as an electrode having the same potential as that of the picture element electrode is formed. As shown in FIG. 8, the auxiliary capacitor counter electrode 41 is connected to the drain electrode 14g of the TFT 14 via the connection electrode 43a.

The auxiliary capacitor bus line CSL is patterned concurrently with the gate bus line GL and the gate electrode 14a with the same materials as the gate bus line GL and the gate electrode 14a, in the same manner as in Embodiment 2. The isolated electrode 41 is patterned concurrently with the source bus line SL, the source electrode 14f, and the drain electrode 14g with the same materials as the source bus line SL, the source electrode 14f, and the drain electrode 14g, by the dry etching method described in Embodiments 1 and 2. Further, the connection electrode 43a and the auxiliary capacitor counter electrode 41 can be formed with use of, for example, an ITO (transparent electrode).

Formed on the TFT 14 and the auxiliary capacitor counter electrode 41 is an insulating film 32. A contact hole 42 is formed on the insulating film 32 formed on the auxiliary capacitor counter electrode 41. On the insulating film 32 and an inner surface of the contact hole 42, a picture element electrode 45 and an alignment film 34 are sequentially formed. Examples of materials usable as the insulating film 32 are polyimide and acrylic resin. The ITO is usable as the picture element electrode 45, and the polyimide is usable as the alignment film 34.

So far described was the structure of the TFT substrate 102.

Further, in FIGS. 9 and 10, the counter substrate 103 has a well-known structure, in which a black matrix BM, a color filter CF, a counter electrode 51, and an alignment film 52 are sequentially formed on a glass substrate 50.

Provided between the TFT substrate 102 and the counter substrate 103 is a liquid crystal layer LC.

As described above, in the present embodiment, the isolated electrode 43 serving as the auxiliary capacitor electrode that overlaps the auxiliary capacitor counter electrode 41 so as to form the auxiliary capacitor Cs is positioned on a lower side of the auxiliary capacitor counter electrode 41 and on an upper side of the auxiliary capacitor bus line CSL, so that the isolated electrode 43 is in contact with the auxiliary capacitor bus line CSL. As a result, even if the auxiliary bus line CSL is patterned by wet etching, it is possible to form the auxiliary capacitor electrode by any process; that is, it becomes possible to pattern the auxiliary capacitor electrode by dry etching. Patterning the auxiliary capacitor electrode by dry etching makes it possible to minimize variation in pattern size of the auxiliary capacitor electrode, and therefore, possible to minimize variation in the auxiliary capacitor Cs among panels.

Consequently, even if the auxiliary bus line is patterned by wet etching, it is possible to achieve a display panel in which the variation in the auxiliary capacitance among the panels can be minimized.

So far described were Embodiments of the structure of the auxiliary capacitance. It is possible to achieve a display device that is capable of high quality display with little variation in the auxiliary capacitance, by adding a peripheral circuit, a backlight, a bezel or the like to the display panel including the above-described auxiliary capacitor.

The display panel and the display device applicable are not limited to those employing the liquid crystal, and may be selected from any display device to which the auxiliary capacitance can be added, such display device as that employing dielectric liquid or the like as a display element.

The invention is not limited to the description of the embodiments above, but may be altered within the scope of the claims. An embodiment based on a proper combination of technical means disclosed in different embodiments is encompassed in the technical scope of the invention.

As so far described, a display panel of the present invention is an active matrix type display panel including: pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and auxiliary capacitor bus lines for applying voltages to the auxiliary capacitor electrodes, respectively each auxiliary capacitor electrode being provided on an upper side of a corresponding auxiliary capacitor bus line in a film thickness direction and being connected with the corresponding auxiliary capacitor bus line through a contact hole, and each electrode to have the picture element electrode potential being provided on an upper side of the auxiliary capacitor electrode paired therewith, in the film thickness direction.

This makes it possible to achieve a display panel in which the variation in the auxiliary capacitor among the panels can be minimized even if the auxiliary bus line is patterned by wet etching.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is suitably applicable especially in a liquid crystal display device.

The invention claimed is:

1. An active matrix type display panel comprising:
   a TFT substrate having TFTs serving as selective elements of picture elements; and
   a counter substrate
   the TFT substrate including (i) pairs of electrodes each forming an auxiliary capacitor by overlapping each other, wherein one electrode of each pair of the electrodes is a picture element electrode, and the other one electrode of each pair of the electrodes is an auxiliary capacitor electrode, and
   (ii) auxiliary capacitor bus lines for applying voltages to the auxiliary capacitor electrodes, respectively, the auxiliary capacitor bus lines being formed in a first metal layer including a gate metal layer with which scanning signal lines are formed,
   the auxiliary capacitor electrodes being formed in a second metal layer including a source metal layer with which (i)

data signal lines and (ii) source electrodes and drain electrodes of the TFTs are formed, the second metal layer being formed above the first metal layer such that a first insulating film, semiconductor layers of the TFTs, and the second metal layer are stacked in this order on the first metal layer, the picture element electrode being made up of a transparent electrode formed on a second insulating film which is formed on the second metal layer, each auxiliary capacitor electrode being provided on an upper side of a corresponding auxiliary capacitor bus line in a film thickness direction and being connected with the corresponding auxiliary capacitor bus line through a first contact hole which (i) is formed in the second insulating film, (ii) includes an etching aperture of the auxiliary capacitor electrode and a through hole formed in the first insulating film, and (iii) reaches a top surface of the corresponding auxiliary capacitor bus line, a connection electrode, which is made up of the transparent electrode, being formed on the second insulating film and on an inner surface of the first contact hole so that the auxiliary capacitor electrode and the corresponding auxiliary capacitor bus line are connected with each other via the connection electrode, the picture element electrode being provided on an upper side of the auxiliary capacitor electrode paired therewith, in the film thickness direction, the TFT substrate having a gap adjusting layer formed in part of the first metal layer, (i) which part is in a region in which the picture element electrode and a corresponding drain electrode are connected with each other, and (ii) which part is beneath the corresponding drain electrode, and the picture element electrode and the corresponding drain electrode being connected with each other by providing the picture element electrode on the second insulating film and on an inner surface of a second contact hole which (i) is formed in the second insulating film, (ii) includes an etching aperture of the corresponding drain electrode and a through hole formed in the first insulating film, and (iii) reaches a top surface of the gap adjusting layer.

2. The display panel according to claim 1, further comprising picture elements each of which includes a plurality of sub picture elements that share one scanning signal line and one data signal line, the sub picture elements each being provided with the auxiliary capacitors, respectively.

3. The display panel according to claim 2, wherein:
each picture element includes a first sub picture element and a second sub picture element as the plurality of sub picture elements, the first sub picture element and the second sub picture element being disposed adjacent with each other across the one scanning line along a panel surface,
the auxiliary capacitor bus lines are provided between the scanning signal lines, and
each picture element being adjacent with each other in such a manner that the first sub picture element of each picture element shares a corresponding auxiliary capacitor bus line with the second sub picture element of a picture element being adjacent to the picture element along a direction in which the data signal lines extend, the corresponding auxiliary capacitor bus line being provided between scanning signal lines respectively corresponding to the picture element and the picture element adjacent to the picture element along the direction.

4. The display panel according to claim 1, wherein:
the second insulating film is made up of one or more insulating films covering the selective elements from above.

5. The display panel according to claim 4, which is a liquid crystal display panel driven by a VA mode.

6. An active matrix type display panel comprising:
pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and
auxiliary capacitor bus lines for applying voltages to the auxiliary capacitor electrodes, respectively,
each auxiliary capacitor electrode being provided on an upper side of a corresponding auxiliary capacitor bus line in a film thickness direction and being connected with the corresponding auxiliary capacitor bus line through a contact hole, and
each electrode to have the picture element electrode potential being provided on an upper side of the auxiliary capacitor electrode paired therewith, in the film thickness direction,
wherein:
the electrodes to have the picture element electrode potential are auxiliary capacitor counter electrodes respectively connected with picture element electrodes therebelow via corresponding contact holes, and
the display panel comprises:
a selective element per picture element; and
one or more insulating films between the picture element electrodes and the auxiliary capacitor electrodes, the one or more insulating films covering the selective elements from above.

7. The display panel according to claim 6, which is a liquid crystal display panel driven by a TN mode.

8. A display device comprising a display panel as set forth in claim 1.

9. A method for manufacturing an active matrix type display panel, said active matrix type display panel comprising:
pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and
auxiliary capacitor bus lines for applying voltages to the auxiliary capacitor electrodes, respectively,
each auxiliary capacitor electrode being provided on an upper side of a corresponding auxiliary capacitor bus line in a film thickness direction and being connected with the corresponding auxiliary capacitor bus line through a contact hole, and
each electrode to have the picture element electrode potential being provided on an upper side of the auxiliary capacitor electrode paired therewith, in the film thickness direction,
the method comprising:
performing wet etching to pattern a first metal layer into scanning signal lines and the auxiliary capacitor bus lines, concurrently, the first metal layer being formed on an insulating substrate;
forming a first insulating film on pattern surfaces of the auxiliary capacitor bus lines and the scanning signal lines;

forming a second metal layer on the first insulating film;

performing dry etching to the second metal layer, so as to pattern the second metal layer into data signal lines and the auxiliary capacitor electrodes, concurrently, and so as to connect the auxiliary capacitor electrodes with the auxiliary capacitor bus lines through contact holes of the first insulating film respectively; and forming the electrodes to have the picture electrode potential, above the auxiliary capacitor electrodes in such a manner that the electrodes to have the picture electrode potential and the auxiliary capacitor electrodes sandwich a second insulating film.

10. A method for manufacturing an active matrix type display panel, said active matrix type display panel comprising:

pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and auxiliary capacitor bus lines for applying voltages to the auxiliary capacitor electrodes, respectively each auxiliary capacitor electrode being provided on an upper side of a corresponding auxiliary capacitor bus line in a film thickness direction and being connected with the corresponding auxiliary capacitor bus line through a contact hole, and each electrode to have the picture element electrode potential being provided on an upper side of the auxiliary capacitor electrode paired therewith, in the film thickness direction, the method comprising:

performing wet etching to pattern a first metal layer into scanning signal lines and the auxiliary capacitor bus lines, concurrently, the first metal layer being formed on an insulating substrate;

forming a first insulating film on pattern surfaces of the auxiliary capacitor bus lines and the scanning signal lines;

forming a second metal layer on the first insulating film, the second metal layer being a laminate film;

performing dry etching to at least a lowest-layer film of the second metal layer, so as to pattern the second metal layer into data signal lines and the auxiliary capacitor electrodes, concurrently, and so as to connect the auxiliary capacitor electrodes with the auxiliary capacitor bus lines through contact holes of the first insulating film respectively; and forming the electrodes to have the picture electrode potential, above the auxiliary capacitor electrodes in such a manner that the electrodes to have the picture electrode potential and the auxiliary capacitor electrodes sandwich a second insulating film.

11. A method for manufacturing an active matrix type display panel, the active matrix type display panel comprising:

pairs of electrodes each forming an auxiliary capacitor by overlapping each other, wherein one electrode of each pair of the electrodes is an electrode to have a picture element electrode potential, and the other one electrode of each pair of the electrodes is an auxiliary capacitor electrode; and auxiliary capacitor bus lines for applying voltages to the auxiliary capacitor electrodes, respectively, each auxiliary capacitor electrode being provided on an upper side of a corresponding auxiliary capacitor bus line in a film thickness direction and being connected with the corresponding auxiliary capacitor bus line through a contact hole, and each electrode to have the picture element electrode potential being provided on an upper side of the auxiliary capacitor electrode paired therewith, in the film thickness direction, the method comprising:

forming a first insulating film on pattern surfaces of scanning signal lines and the auxiliary capacitor bus lines;

forming a second metal layer on the first insulating film, the second metal layer being a laminate film;

patterning the second metal layer into a metal layer pattern including patterns of the auxiliary capacitor electrodes; and aligning a pattern of a transparent electrode to the metal layer pattern by a lens-scanning method or a stepper method with use of the metal layer pattern as a position reference, the transparent electrode and the metal layer pattern sandwiching a second insulating film therebetween.

12. The method as set forth in claim 9, wherein the first metal layer and the second metal layer are formed from identical materials.

13. The method as set forth in claim 10, wherein the first metal layer and the second metal layer are formed from identical materials.

14. A method for manufacturing a display panel as set forth in claim 1, the method comprising:

performing wet etching to pattern the first metal layer into the scanning signal lines, the auxiliary capacitor bus lines, and the gap adjusting layers concurrently, the first metal layer being formed on an insulating substrate;

forming the first insulating film on pattern surfaces of the first metal layer;

forming the semiconductor layers of the TFTs on the first insulating film;

forming the second metal layer on the semiconductor layers;

performing dry etching to the second metal layer, so as to pattern the second metal layer into the data signal lines, the auxiliary capacitor electrodes, the source electrodes, and the drain electrodes concurrently in such a manner that the apertures of the auxiliary capacitor electrodes and the apertures of the drain electrodes are formed;

forming the first contact hole and the second contact hole in the second insulating film after the second insulating film is formed on entire pattern surfaces of the second metal layer;

forming the picture element electrode on the second insulating film and on the inner surface of the second contact hole so that the picture element electrode is connected to the corresponding drain electrode; and forming the connection electrode on the second insulating film and on the inner surface of the first contact hole so that the auxiliary capacitor electrode is connected to the corresponding auxiliary capacitor bus line.

15. A method for manufacturing a display panel as set forth in claim 1, the method comprising:

performing wet etching to pattern the first metal layer into the scanning signal lines, the auxiliary capacitor bus lines, and the gap adjusting layers concurrently, the first metal layer being formed on an insulating substrate;

forming the first insulating film on pattern surfaces of the first metal layer;

forming the semiconductor layers of the TFTs on the first insulating film;

forming the second metal layer on the semiconductor layers, the second metal layer being a laminate film;

performing dry etching to at least a lowest-layer film of the second metal layer, so as to pattern the second metal layer into the data signal lines, the auxiliary capacitor electrodes, the source electrodes, and the drain electrodes concurrently in such a manner that the apertures of the auxiliary capacitor electrodes and the apertures of the drain electrodes are formed;

forming the first contact hole and the second contact hole in the second insulating film after the second insulating film is formed on entire pattern surfaces of the second metal layer;

forming the picture element electrode on the second insulating film and on the inner surface of the second contact hole so that the picture element electrode is connected to the corresponding drain electrode; and forming the connection electrode on the second insulating film and on the inner surface of the first contact hole so that the auxiliary capacitor electrode is connected to the corresponding auxiliary capacitor bus line.

16. A method for manufacturing a display panel as set forth in claim 1, the method comprising:

forming the first insulating film on pattern surfaces of the first metal layer;

forming the semiconductor layers of the TFTs on the first insulating film;

forming the second metal layer on the semiconductor layers, the second metal layer being a laminate film;

patterning the second metal layer into a metal layer pattern including patterns of the auxiliary capacitor electrodes; and aligning a pattern of the transparent electrode to the metal layer pattern by a lens-scanning method or a stepper method with use of the metal layer pattern as a position reference, the transparent electrode and the metal layer pattern sandwiching the second insulating film therebetween.

* * * * *